(12) United States Patent
Yamasaki et al.

(10) Patent No.: US 8,068,402 B2
(45) Date of Patent: Nov. 29, 2011

(54) OPTICAL HEAD, OPTICAL DISC DEVICE, COMPUTER, OPTICAL DISC PLAYER AND OPTICAL DISC RECORDER

(75) Inventors: Fumitomo Yamasaki, Nara (JP); Yoshiaki Komma, Osaka (JP); Toshiyasu Tanaka, Osaka (JP); Yohichi Saitoh, Kyoto (JP)

(73) Assignee: Panasonic Corporation, Osaka (JP)

( * ) Notice: Subject to any disclaimer, the term of this patent is extended or adjusted under 35 U.S.C. 154(b) by 106 days.

(21) Appl. No.: 12/598,967

(22) PCT Filed: Apr. 28, 2008

(86) PCT No.: PCT/JP2008/001117
§ 371 (c)(1),
(2), (4) Date: Nov. 5, 2009

(87) PCT Pub. No.: WO2008/139715
PCT Pub. Date: Nov. 20, 2008

(65) Prior Publication Data
US 2010/0142358 A1 Jun. 10, 2010

(30) Foreign Application Priority Data
May 8, 2007 (JP) .................................. 2007-123203

(51) Int. Cl.
*G11B 7/00* (2006.01)
(52) U.S. Cl. .............................. 369/112.23; 369/112.01
(58) Field of Classification Search .......................... None
See application file for complete search history.

(56) References Cited

U.S. PATENT DOCUMENTS

| | | | |
|---|---|---|---|
| 4,968,874 A | 11/1990 | Kasuga | |
| 5,602,383 A * | 2/1997 | Takekoshi et al. | 369/112.15 |
| 5,862,118 A * | 1/1999 | Takahashi | 369/44.23 |
| 6,730,896 B1 * | 5/2004 | Yamada | 250/201.5 |
| 7,142,489 B2 | 11/2006 | Nishiwaki et al. | |
| 7,280,453 B2 * | 10/2007 | Arai | 369/53.2 |
| 7,518,976 B2 | 4/2009 | Sano et al. | |
| 2002/0110053 A1 * | 8/2002 | Araki et al. | 369/44.23 |
| 2004/0057369 A1 * | 3/2004 | Ikegame | 369/112.17 |
| 2004/0213116 A1 | 10/2004 | Arai | |
| 2004/0252612 A1 | 12/2004 | Yamasaki et al. | |
| 2005/0036432 A1 | 2/2005 | Kim et al. | |

(Continued)

FOREIGN PATENT DOCUMENTS

JP 1-302548 12/1989
(Continued)

*Primary Examiner* — Lixi C Simpson
(74) *Attorney, Agent, or Firm* — Wenderoth, Lind & Ponack, L.L.P.

(57) ABSTRACT

An optical head is provided with a light source for outputting laser light having a wavelength of 430 nm or less; an objective lens for collecting the laser light outputted from the light source to an optical disc having a plurality of information recording surfaces; a light receiving element for receiving laser light reflected on the optical disc; and a detecting lens for guiding the laser light reflected on the optical disc to the light receiving element. The detecting lens is formed of a resin material. The detecting lens is arranged so that a light collecting position of the laser light reflected on an information recording surface different from an information recording surface having a thinnest protection substrate, among the information recording surfaces, is outside the detecting lens, at the time of recording or reproducing information on or from the information recording surface having the thinnest protection substrate.

19 Claims, 16 Drawing Sheets

U.S. PATENT DOCUMENTS

| | | |
|---|---|---|
| 2006/0013107 A1 | 1/2006 | Nishiwaki et al. |
| 2006/0077550 A1* | 4/2006 | Sano et al. .................. 359/558 |
| 2007/0223349 A1* | 9/2007 | Shimada et al. ......... 369/112.16 |
| 2008/0019254 A1 | 1/2008 | Mori et al. |
| 2008/0137513 A1 | 6/2008 | Mori et al. |
| 2008/0267019 A1* | 10/2008 | Kimura et al. ............ 369/44.12 |
| 2009/0219795 A1 | 9/2009 | Yamanaka |

FOREIGN PATENT DOCUMENTS

| | | |
|---|---|---|
| JP | 9-180244 | 7/1997 |
| JP | 2003-77163 | 3/2003 |
| JP | 2004-348941 | 12/2004 |
| JP | 2005-25923 | 1/2005 |
| JP | 2005-32423 | 2/2005 |
| JP | 2008-27507 | 2/2008 |
| JP | 2008-130167 | 6/2008 |
| WO | 2004/040562 | 5/2004 |
| WO | 2004/068480 | 8/2004 |
| WO | 2007/046284 | 4/2007 |

* cited by examiner

ASYMMETRICAL

FOCUS ERROR SIGNAL

DEFOCUS

SYMMETRICAL

FOCUS ERROR SIGNAL

DEFOCUS

OPTICAL HEAD, OPTICAL DISC DEVICE, COMPUTER, OPTICAL DISC PLAYER AND OPTICAL DISC RECORDER

TECHNICAL FIELD

The present invention relates to an optical head for recording or reproducing information on or from an information recording medium such as an optical disc by collecting blue-violet laser light, and an optical disc device provided with the optical head, as well as a computer, an optical disc player, and an optical disc recorder each provided with the optical disc device.

BACKGROUND ART

In recent years, as a blue-violet semiconductor laser has been put into practical use, a Blu-ray disc (hereinafter, called as a BD) as a high-density and large-capacity optical information recording medium (hereinafter, also called as an optical disc) having the same size as a CD (Compact Disc) or a DVD (Digital Versatile Disc) has been put into practical use. The BD is an optical disc having a protection substrate of about 0.1 mm in thickness, and is used in recording or reproducing with use of a blue-violet laser light source of about 400 nm wavelength, and an objective lens having a numerical aperture (NA) as high as 0.85.

Similarly to the above, an HD DVD, which has a protection substrate of about 0.6 mm in thickness, and is used with a blue-violet laser light source of about 400 nm wavelength, and an objective lens having a numerical aperture of 0.65, has also been put into practical use. The optical discs to be recorded or reproduced using a blue-violet laser light source are generically called as high-density optical discs.

There has been proposed an optical head for recording or reproducing information on or from the high-density optical disc by collecting blue-violet laser light. A construction example of the optical head is shown in FIG. 17. Referring to FIG. 17, the reference numeral 101 indicates a light source for emitting blue-violet laser light, 102 indicates a diffraction grating, 103 indicates a polarized beam splitter as a light splitting element, 104 indicates a collimator lens, 105 indicates a quarter wave plate, 106 indicates an achromatic lens, 107 indicates an objective lens, 108 indicates a detecting lens, and 110 indicates a light receiving element. These parts constitute an optical head 130. The reference numeral 160 indicates a high-density optical disc having two layers of information recording surfaces.

In the following, described is an operation of the optical head 130 for recording or reproducing information on or from the optical disc 160. Blue-violet laser light emitted from the light source 101 is divided into a main beam as zero-order light and a sub beam as ±first-order diffracted light by the diffraction grating 102. The main beam and the sub beam are transmitted through the polarized beam splitter 103, and converted into substantially parallel light by the collimator lens 104. The main beam and the sub beam converted into the substantially parallel light are converted from linearly-polarized light into circularly-polarized light by the quarter wave plate 105, transmitted through the achromatic lens 106, and collected on an information recording surface of the optical disc 160 as a light spot through a protection substrate by the objective lens 107.

After reflected on the information recording surface of the optical disc 160, the main beam and the sub beam are transmitted through the objective lens 107 and the achromatic lens 106, converted into linearly-polarized light different from the incoming path by the quarter wave plate 105, transmitted through the collimator lens 104, and reflected on the polarized beam splitter 103. After being subjected to astigmatism by the detecting lens 108, the reflected main beam and sub beam are guided to the light receiving element 110, where an information signal and a servo signal are generated.

In this example, as a method for detecting a focus error signal, there is used e.g. a so-called astigmatism method, wherein astigmatism is imparted to laser light on the outgoing path by the detecting lens 108, and a focus error signal is obtained using a four-divided light receiving pattern. As a method for detecting a tracking error signal, there is used e.g. a so-called 3-beam method or differential push-pull method (DPP method) using a main beam and a sub beam generated by the diffraction grating 102.

There is known a drawback peculiar to an optical head for recording or reproducing on or from an optical disc, using blue-violet laser light of about 400 nm wavelength. Specifically, in the case where a resin is used as a material for an optical component constituting an optical system, absorption of blue-violet laser light is gradually increased in the interior of the optical component, with the result that the light transmittance of the resinous optical component is gradually lowered. For instance, a portion where blue-violet laser light is transmitted may turn yellow, or a surface of the light transmitted portion may become rough, with the result that the transmittance of the light transmitted portion with respect to laser light is lowered. The lowered transmittance of the optical component may degrade the S/N ratio of an information signal, a focus error signal, and a tracking error signal, which may lower reliability of a device incorporated with the optical head.

In view of the above, for instance, patent literature 1 discloses an optical head constituted of an optical component having a UV resistance. In the specification, the UV resistance means a property that no physical change occurs in a UV resistant member, even if the member is exposed to UV light for a long term. An example of the UV resistant member is an optical component made of silica glass, as a kind of a glass material. A detecting lens is also made of silica glass having a UV resistance.

Forming an optical component of a resin is advantageous in simplifying the arrangement of an optical head, and making the optical head lightweight and inexpensive. In view of this, a resin having a relatively high UV resistance is used for an optical component to be used at a site where the light flux diameter of blue-violet laser light to be transmitted or reflected is large, and the laser light amount per unit area is relatively small. For instance, an optical head incorporated with e.g. the collimator lens 104 or the achromatic lens 106 in FIG. 17, which is made of a resin, has been put into practical use.

In recording or reproducing on or from the optical disc 160 having plural information recording surfaces, reflected light from an information recording surface other than a targeted information recording surface to be used in information recording or reproducing is collected at a position different from the light receiving element 110. For instance, as shown in FIG. 18, in recording or reproducing on or from a first information recording surface of the optical disc 160, laser light L2 reflected on a second information recording surface, which is different from the first information recording surface to be used in information recording or reproducing, and is located at a rearward position, viewed from the side of the objective lens 107, is collected at a forward position of the light receiving element 110 with respect to laser light L1 reflected on the first information recording surface.

As described above, since the laser light flux diameter is small, and the laser light amount per unit area is exceedingly large at a position where laser light is collected, it is difficult to use a detecting lens made of a resin at the light collecting position. Further, in the case where information is recorded or reproduced on or from the optical disc 160 having plural information recording surfaces by the optical head using blue-violet laser light of about 400 nm wavelength, particularly, an intensity of reflected light from an information recording surface other than a targeted information recording surface to be used in information recording or reproducing is increased, and the laser light amount per unit area is increased. Thus, it has been actually impossible to use a detecting lens made of a resin in an optical head using blue-violet laser light.

Further, heretofore, there has been no description about an influence of reflected light from an information recording surface other than a targeted information recording surface to be used in information recording or reproducing, to the position of a detecting lens. Conventionally, a detecting lens has been made of a material other than a resin i.e. a glass material having a UV resistance. Thus, there is no disclosure about an arrangement of using a detecting lens made of a resin, in view of the above influence.

Furthermore, in the case where the detecting lens 108 is subjected to positional adjustment in the optical axis direction to correct an offset of a focus error signal resulting from e.g. a positional displacement between the light receiving element 110 and the light source 101, if the positional displacement is large, it is required to largely move the detecting lens 108. As a result, as shown in FIG. 18, reflected light from an information recording surface other than a targeted information recording surface to be used in information recording or reproducing is collected near the detecting lens 108 or inside the detecting lens 108 by the positional adjustment.

In the above arrangement, since the laser light amount per unit area at the light collecting position is exceedingly large, it is impossible to use a detecting lens made of a resin, as the detecting lens 108. However, the conventional arrangement has been made based on the premise that the detecting lens 108 is made of a glass material, and there has been no need of considering the above drawback. Thus, there has been made no investigation about an arrangement of using a detecting lens made of a resin, considering the positional adjustment.

Patent literature 1: JP2003-77163A

SUMMARY OF THE INVENTION

An object of the invention is to provide an optical head for recording and/or reproducing information on and/or from a high-density information recording medium having plural information recording surfaces, using blue-violet laser light, that enables to use a detecting lens made of a resin, and more particularly to provide a compact and inexpensive optical head and optical disc device by using the detecting lens made of a resin.

An optical head according to an aspect of the invention includes: a light source for emitting laser light of 430 nm wavelength or less; an objective lens for collecting the laser light emitted from the light source on an information recording medium having plural information recording surfaces; a light receiving element for receiving laser light reflected on the information recording medium; and a detecting lens for guiding the laser light reflected on the information recording medium to the light receiving element, wherein the detecting lens is made of a resin material, and the detecting lens is disposed at such a position that a light collecting position of the laser light reflected on an information recording surface different from an information recording surface having a thinnest protection substrate, among the plural information recording surfaces of the information recording medium, is located outside the detecting lens, in recording or reproducing on or from the information recording surface having the thinnest protection substrate.

According to the optical head of this invention, the detecting lens is disposed at such a position as to avoid an increase in the laser light amount per unit area by collection of laser light of 430 nm wavelength or less, concerning both of reflected light from a targeted information recording surface having a thinnest protection substrate and to be used in information recording or reproducing, and reflected light from an information recording surface other than the targeted information recording surface to be used in information recording or reproducing, in recording or reproducing on or from the targeted information recording surface. This enables to use a detecting lens made of a resin, and enables to realize an optical head in a small size and at a low cost by using the detecting lens made of a resin.

DETAILED DESCRIPTION OF THE INVENTION

In the following, an optical head, an optical disc device, a computer, an optical disc player, and an optical disc recorder in accordance with embodiments of the invention are described referring to the accompanying drawings.

First Embodiment

Figure 1:
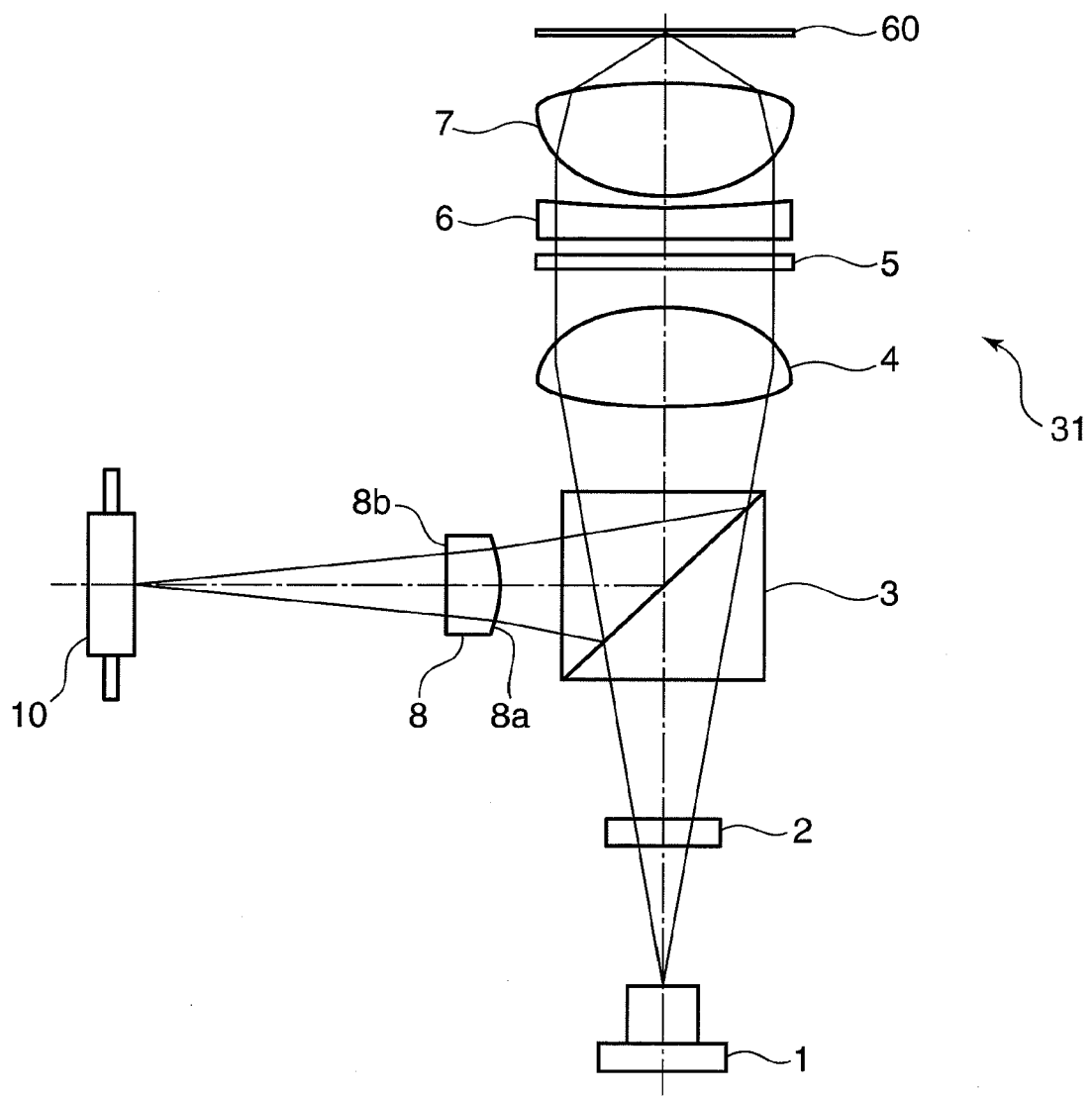
FIG. 1 is a schematic construction diagram of an optical head in the first embodiment of the invention.

An optical head in accordance with the first embodiment of the invention is described referring to FIGS. 1 through 4. FIG. 1 is a schematic construction diagram of the optical head in the first embodiment.

Referring to FIG. 1, the reference numeral 1 indicates a light source for emitting blue-violet laser light, 2 indicates a diffraction grating, 3 indicates a polarized beam splitter, 4 indicates a collimator lens, 5 indicates a quarter wave plate, 6 indicates an achromatic lens, 7 indicates an objective lens, 8 indicates a detecting lens, and 10 indicates a light receiving element. These parts constitute an optical head 31. The reference numeral 60 indicates a high-density optical disc having two layers of information recording surfaces (first and second information recording surfaces) with protection substrates of 0.075 mm and 0.1 mm in thickness, respectively.

In the following, an operation of the optical head 31 for recording or reproducing information on or from the optical disc 60 is described. Blue-violet laser light emitted from the light source 1 is divided into a main beam as zero-order light and a sub beam as first-order diffracted light by the diffraction grating 2. The main beam and the sub beam are transmitted through the polarized beam splitter 3, and converted into substantially parallel light by the collimator lens 4. The main beam and the sub beam converted into the substantially parallel light are converted from linearly-polarized light into circularly-polarized light by the quarter wave plate 5, transmitted through the achromatic lens 6, and collected on an information recording surface of the optical disc 60 as a light spot through a protection substrate by the objective lens 7.

After reflected on the information recording surface of the optical disc 60, the main beam and the sub beam are transmitted through the objective lens 7 and the achromatic lens 6, converted into linearly-polarized light different from the incoming path by the quarter wave plate 5, transmitted through the collimator lens 4, and reflected on the polarized beam splitter 3. After being subjected to astigmatism by the detecting lens 8, the reflected main beam and sub beam are guided to the light receiving element 10, where an information signal and a servo signal are generated.

In this example, as a method for detecting a focus error signal, there is used e.g. a so-called astigmatism method, wherein astigmatism is imparted to laser light on the outgoing path by the detecting lens 8, and a focus error signal is obtained using a four-divided light receiving pattern. As a method for detecting a tracking error signal, there is used e.g. a so-called 3-beam method or differential push-pull method (DPP method) using a main beam and a sub beam generated by the diffraction grating 2.

The collimator lens 4 is movable in the optical axis direction. By moving the collimator lens 4 toward the light source 1 with respect to a reference position where emitted light from the collimator lens 4 is collimated into substantially parallel light, the emitted light from the collimator lens 4 is turned into divergent light. Thus, in the case where the thickness of the protection substrate of the optical disc 60 is increased by moving the collimator lens 4 toward the light source 1, for instance, spherical aberration generated in recording or reproducing on or from the second recording surface having a protection substrate of 0.1 mm in thickness is corrected. On the other hand, by moving the collimator lens 4 toward the objective lens 7, the emitted light from the collimator lens 4 is turned into convergent light. Thus, in the case where the thickness of the protection substrate of the optical disc 60 is decreased by moving the collimator lens 4 toward the objective lens 7, for instance, spherical aberration generated in recording or reproducing on or from the first recording surface having a protection substrate of 0.075 mm in thickness is corrected.

As means for moving the collimator lens 4 in the optical axis direction, any means such as a stepping motor, a magnetic circuit, or an actuator to be operated by driving a piezoelectric element may be applicable.

A surface (a first surface) of the achromatic lens 6 on the side of the collimator lens 4 is a diffraction surface having a convex power, and a surface (a second surface) of the achromatic lens 6 on the side of the objective lens 7 is a refractive surface having a concave power. The diffraction surface has a diffraction structure composed of plural concentric ring bands, and is so configured as to obtain a maximum diffraction efficiency at the wavelength of the light source 1.

In this example, the wavelength of laser light from the light source 1 varies at the time of switching between a recording power and a reproducing power, by a change in ambient temperature, or a like factor. As the wavelength of laser light is shortened, an influence resulting from variation of an optimal image point position, which is generated resulting from variation of a refractive index of a material of the objective lens 7 due to wavelength variation, is increased. Accordingly, it is a general practice to provide, particularly in a recordable optical head, a chromatic aberration correcting function for correcting variation of an optimal image point position resulting from wavelength variation.

The achromatic lens 6 functions as an afocal lens having a convex diffractive power and a concave refractive power substantially equal to each other in incidence of parallel light having a reference wavelength of the light source 1. However, in the case where the wavelength of laser light is increased, the diffraction angle of laser light on a diffraction surface is increased, with the result that the convex power is increased. If parallel light is incident in this state, the achromatic lens 6 functions as a lens for emitting convergent light. On the other hand, in the case where the wavelength of laser light is shortened, the diffraction angle of laser light on the diffraction surface is reduced, with the result that the concave power is increased. If parallel light is incident in this state, the achromatic lens 6 functions as a lens for emitting divergent light. This means that the achromatic lens 6 has a function of canceling variation of an optimal image point position generated in the objective lens 7, and has an effect of so-called chromatic aberration correction.

In the optical head 31, the collimator lens 4 and the achromatic lens 6 have a largest light flux diameter of laser light to be transmitted, and a relatively small laser light amount per unit area. Accordingly, it is preferable to form the collimator lens 4 and the achromatic lens 6 of a resin material having a relatively high UV resistance to simplify the arrangement of the optical head, and making the optical head lightweight and inexpensive.

In this embodiment, the detecting lens 8 is also made of a resin having a relatively high UV resistance. The detecting lens 8 is configured in such a manner that a laser light incident surface 8a is formed into a convex cylindrical surface (a cylindrical surface), and a laser light exit surface 8b is formed into a flat surface. Thereby, astigmatism can be imparted to laser light for obtaining a focus error signal by an astigmatism method.

The optical disc 60 has plural information recording surfaces i.e. the first information recording surface with a protection substrate of 0.075 mm in thickness, and a second information recording surface with a protection substrate of 0.1 mm in thickness. Accordingly, when laser light is irradiated onto a targeted information recording surface to be used in information recording or reproducing, laser light is reflected on an information recording surface other than the targeted information recording surface to be used in information recording or reproducing.

Figure 2:
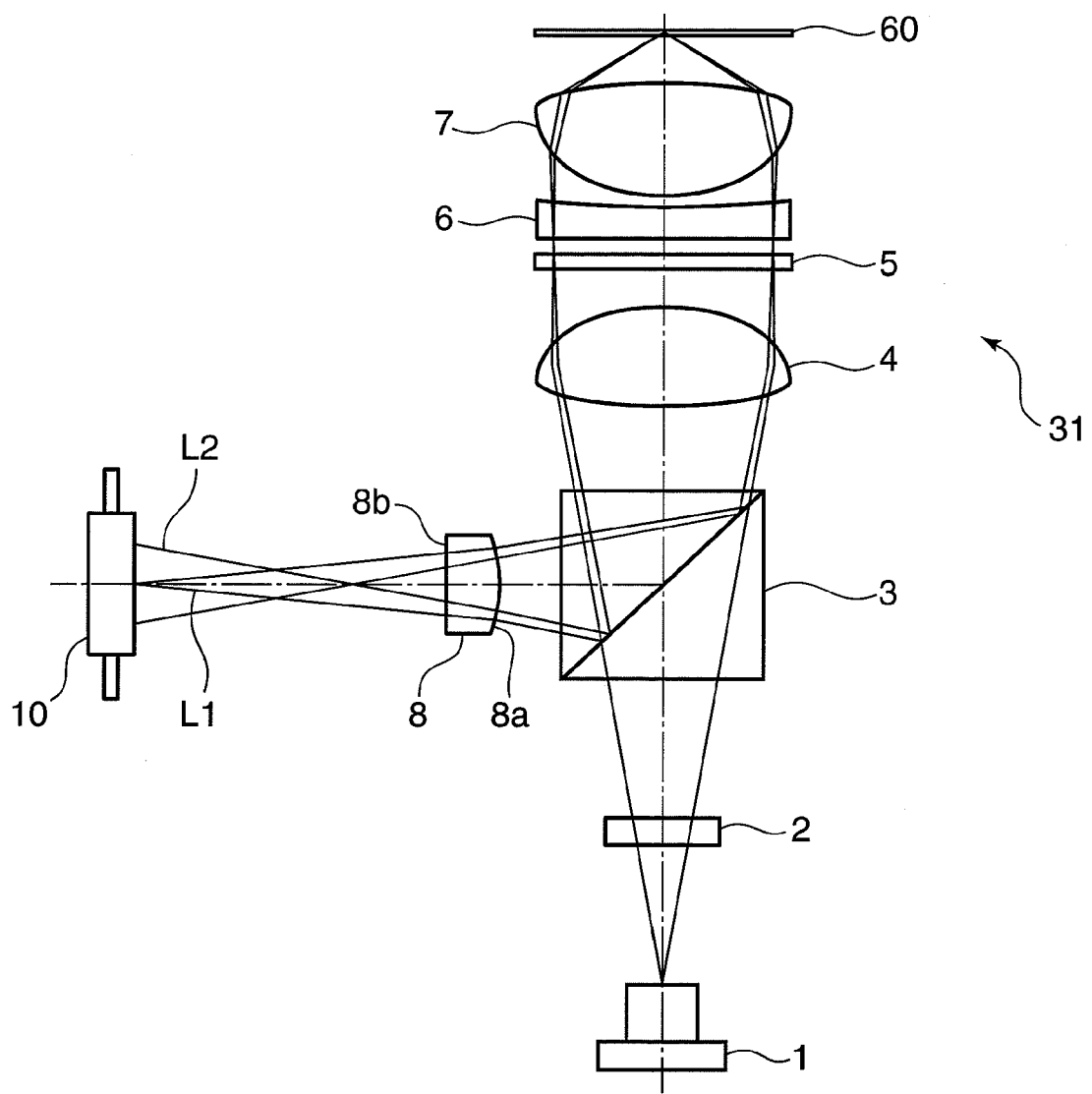
FIG. 2 is a diagram schematically showing a state of laser light reflected on a first information recording surface, and laser light reflected on a second information recording surface, in recording or reproducing from the first information recording surface in the first embodiment of the invention.

FIG. 2 is a diagram schematically showing a state of laser light L1 reflected on the first information recording surface, and laser light L2 reflected on the second information recording surface, in recording or reproducing on or from the first information recording surface of the optical disc 60.

As shown in FIG. 2, the laser light L2 is collected at a forward position of the light receiving element 10. However, the detecting lens 8 in this embodiment is disposed at such a position that both of the laser light L1 reflected on the first information recording surface, and the laser light L2 reflected on the second information recording surface are not collected, in other words, a light collecting position of laser light reflected on the second information recording surface different from the first information recording surface having a thinnest protection substrate is located outside the detecting lens 8 (an outer position of a cross section of the detecting lens 8). In this arrangement, the light flux diameter of laser light to be transmitted through the detecting lens 8 is increased, and the laser light amount per unit area is reduced.

In this example, the light collecting position of laser light L2 reflected on the second information recording surface having a protection substrate thickness of 0.1 mm is obtained by paraxial calculation.

First, laser light parallel incident to the objective lens 7 is collected at a position of the focal length fol with respect to a principal plane of the objective lens 7 as a reference plane. In this case, reflected light from the second information recording surface (e.g. having a protection substrate thickness t2=0.1 mm) different from the first information recording surface (e.g. having a protection substrate thickness t1=0.075 mm) to be used in information recording or reproducing is assumed to be emitted from a position displaced from the focal length fol by a focus displacement amount $\Delta d$ with respect to the principal plane of the objective lens 7 as the reference plane.

The air conversion length of the focus displacement amount $\Delta d$ is expressed by the following formula, wherein t1 is a protection substrate thickness of the first information recording surface, t2 is a protection substrate thickness of the second information recording surface, and n is a refractive index of the protection substrate:

$$\Delta d = 2 \cdot \Delta t / n \quad (1)$$

where $\Delta t = t2 - t1$.

In this example, air conversion means converting an intervening element having a thickness of t0 and a refractive index of n0 into an air element having a thickness of t0/n0. In the specification, an air conversion value indicates an optical path length obtained by converting an intervening element on the optical path into an air element by the above formula.

The point S (a distance between the light collecting point and the principal plane of the objective lens 7 on the side of the collimator lens 4) where reflected light from the second information recording surface is collected by the objective lens 7 is expressed by the following formula, using an image forming formula of a lens:

$$1/S + 1/(fol + \Delta d) = 1/fol \quad (2)$$

Then, $$S = fol \cdot (fol + \Delta d) / \Delta d \quad (3)$$
$$= (fol)^2 / \Delta d + fol$$

Next, assuming that the distance between the principal plane of the objective lens 7 and the principal plane of the collimator lens 4 is L (an air conversion value), the imaginary object point S' (a distance between the imaginary object point and the principal plane of the collimator lens 4 on the side of the objective lens 7) of laser light to be incident into the collimator lens 4 is expressed by the following formula (4):

$$-S' = S - L \quad (4)$$

Accordingly, assuming that the focal length of the collimator lens 4 is fcl, the point X (a distance between the light collecting point and the principal plane of the collimator lens 4 on the side of the detecting lens 8) where light is collected by the collimator lens 4 is expressed by the following formula, using the image forming formula of a lens:

$$1/X - 1/(S-L) = 1/fcl \quad (5)$$

Then, $$X = fcl \cdot (S-L)/(S-L+fcl) \quad (6)$$

The distance $\Delta D$ between the light collecting point of reflected light L1 from the first information recording surface to be used in information recording or reproducing, and the light collecting point of reflected light L2 from the second information recording surface is expressed by the following formula:

$$\Delta D = fcl - X \quad (7)$$

Accordingly, the following formula (8) is derived:

$$\Delta D = fcl^2/(S-L+fcl) \quad (8)$$

The following formula is derived from the formulas (1) through (8):

$$\Delta D = fcl^2/((n \cdot fol^2/(2 \cdot \Delta t)) + fol + fcl - L) \quad (9)$$

where each symbol indicates the following:

$\Delta D$: a distance (an air conversion value) between the light collecting point of reflected light L1 and the light collecting point of reflected light L2, $\Delta t$: a distance between the first information recording surface and the second information recording surface, n: a refractive index of the protection substrate,
fol: a focal length of the objective lens,
fcl: a focal length of the collimator lens, and
L: a distance (an air conversion value) between the principal plane of the objective lens, and the principal plane of the collimator lens.

For instance, assuming that the optical head 31 in this embodiment has the following construction:
Δt=0.025 mm,
n=1.5,
fol=1.5 mm,
fcl=24.0 mm, and
L=20.0 mm,
then, ΔD=7.89 mm.

In the case where the distance Δt between the first information recording surface and the second information recording surface is very small, the distance ΔD' between the light collecting point of reflected light L1 from the first information recording surface to be used in information recording or reproducing, and the light collecting point of reflected light L2 from the second information recording surface is expressed by the following formula:

$$\Delta D' = 2 \cdot (\Delta t/n) \cdot (fcl/fol)^2 \quad (10)$$

In this example, the distance ΔD between the light collecting point of reflected light L1 and the light collecting point of reflected light L2 indicates a distance from a light receiving surface of the light receiving element 10 to the light collecting point of reflected light L2. Accordingly, assuming that the thickness of the detecting lens 8 is td, and the refractive index of the detecting lens 8 is nd, it is required to dispose the detecting lens 8 at such a position that the distance Ld (an air conversion value) between the light exit surface 8b of the detecting lens 8 on the side of the light receiving element 10, and the light receiving surface of the light receiving element 10 satisfies the following formula (11) or (12) to exclude the light collecting point of reflected light L2 from the detecting lens 8:

$$\Delta D > Ld + td/nd \quad (11)$$

$$\Delta D < Ld \quad (12)$$

It is known that the transmittance of a resin is lowered by irradiation of blue-violet laser light, depending on an integrated light amount (a value obtained by multiplying a laser light amount per unit area with an irradiation time) of blue-violet laser light to be irradiated. In view of this, in use of a detecting lens made of a resin, it is preferable to dispose the detecting lens 8 at such a position as to increase the light flux diameter of blue-violet laser light to be transmitted, in other words, reduce the laser light amount per unit area, in order to extend a time capable of securing a predetermined transmittance with respect to irradiation of blue-violet laser light.

In this example, as shown in the formula (11), disposing the detecting lens 8 on the side of the light receiving element 10 with respect to the light collecting point of laser light L2 reflected on the second information recording surface is advantageous in miniaturizing the detecting lens 8, because a light flux diameter required for the detecting lens 8 can be reduced.

On the other hand, as shown in the formula (12), disposing the detecting lens 8 on the side of the objective lens 7 i.e. on the side of the polarized beam splitter 3 with respect to the light collecting point of laser light L2 reflected on the second information recording surface is advantageous in facilitating production of the detecting lens 8, because the curvature radius of the detecting lens 8 for obtaining a predetermined focal length can be increased.

Figure 3:
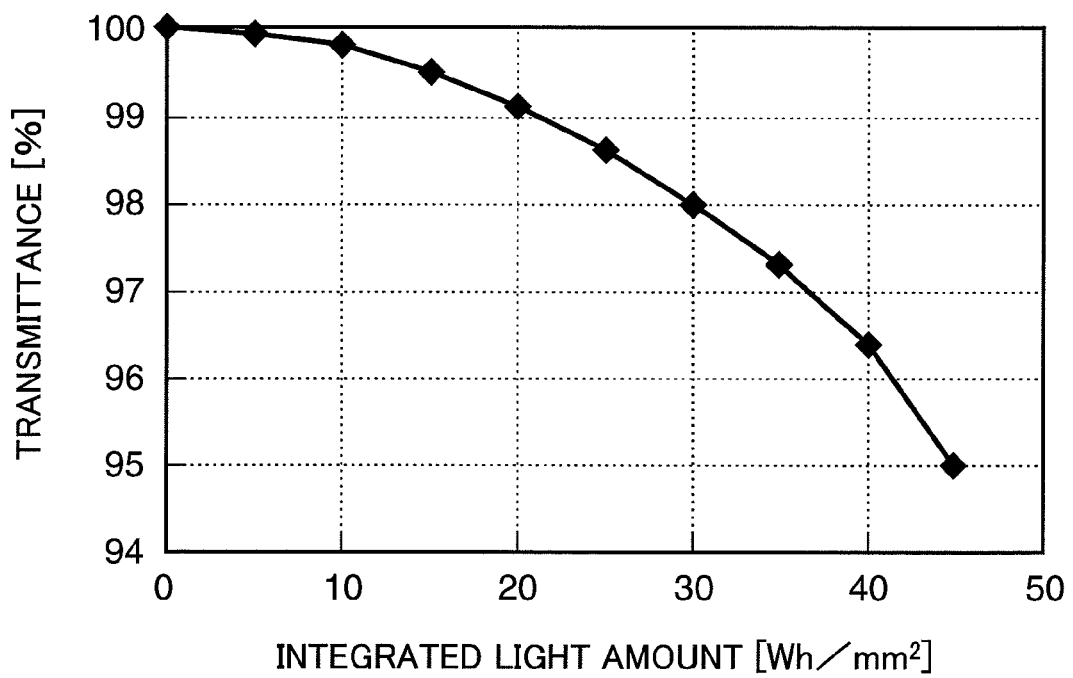
FIG. 3 is a graph showing a relation between an integrated light amount and a transmittance, as an optical characteristic of a resin having a relatively high UV resistance.

FIG. 3 is a graph showing a measurement result i.e. a relation between an integrated light amount (unit: Wh/mm$^2$) and a transmittance (unit: %) of a resin RA having a relatively high UV resistance. In FIG. 3, the axis of abscissas indicates an integrated light amount obtained by multiplying a blue-violet laser light amount (unit: mW/mm$^2$) per unit area with an irradiation time (unit: hour), and the axis of ordinate indicates a transmittance (assuming that the transmittance in an initial state is 100%) of the resin RA having a predetermined thickness, in the case where blue-violet laser light is irradiated.

It is obvious from FIG. 3 that an integrated light amount is 30 Wh/mm$^2$ to secure a transmittance of e.g. 98% for the resin RA. Accordingly, in the case where the transmittance of 98% is secured after 1,000-hours irradiation of blue-violet laser light, the laser light amount Pw to be irradiated onto the detecting lens 8 made of the resin RA per unit area is required to be 30 mW/mm$^2$ or less. It is possible to use e.g. ZEONEX-330R or ZEONEX-340R of ZEON Corp., as an example of the resin RA having the optical characteristic as described above i.e. a relatively high UV resistance.

In this example, assuming that the recording power (a laser light amount to be emitted from the objective lens 7) of the optical disc 60 is set to 18 mW, the reflectances of the first and the second information recording surfaces are respectively set to 8%, and the total loss of transmittances and reflectances of laser light reflected on the first or the second information recording surface with respect to the optical components up to the detecting lens 8 is set to 20%, the light amount Pw1 of laser light L1 reflected on the first information recording surface, and the light amount Pw2 of laser light L2 reflected on the second information recording surface respectively become about 1.15 mW.

Considering the above, in the case where the detecting lens 8 is disposed at such a position that the distance between the light receiving surface of the light receiving element 10 and the light exit surface 8b of the detecting lens 8 is set to 9.0 mm, the light flux diameter D1, on the light exit surface 8b, of laser light L1 reflected on the first information recording surface is set to 0.96 mm, and the light flux diameter D2, on the light exit surface 8b, of laser light L2 reflected on the second information recording surface is set to 0.26 mm. Accordingly, the laser light amount Pw to be irradiated onto the light exit surface 8b of the detecting lens 8 per unit area is expressed by the following formula:

$$Pw = Pw1/((D1/2)^2 \times \pi) + Pw2/((D2/2)^2 \times \pi) \quad (13)$$

Thereby, $$Pw = 23.3 \text{ (unit: mW/mm}^2\text{)} < 30 \text{ (unit: mW/mm}^2\text{)}$$

Thus, it is judged that the transmittance of 98% of the detecting lens 8 can be secured even after 1,000-hours recording on the first information recording surface of the optical disc 60. In this example, a resin having a relatively high UV resistance is a resin, wherein the integrated light amount capable of securing a transmittance of 98% is 30 Wh/mm$^2$ or more, in other words, a resin, wherein a variation of transmittance of the detecting lens 8 is 2% or less after 1,000-hours recording, in the case where the laser light amount to be irradiated onto the detecting lens 8 per unit area is 30 (unit: mW/mm$^2$) or less.

Figure 4:
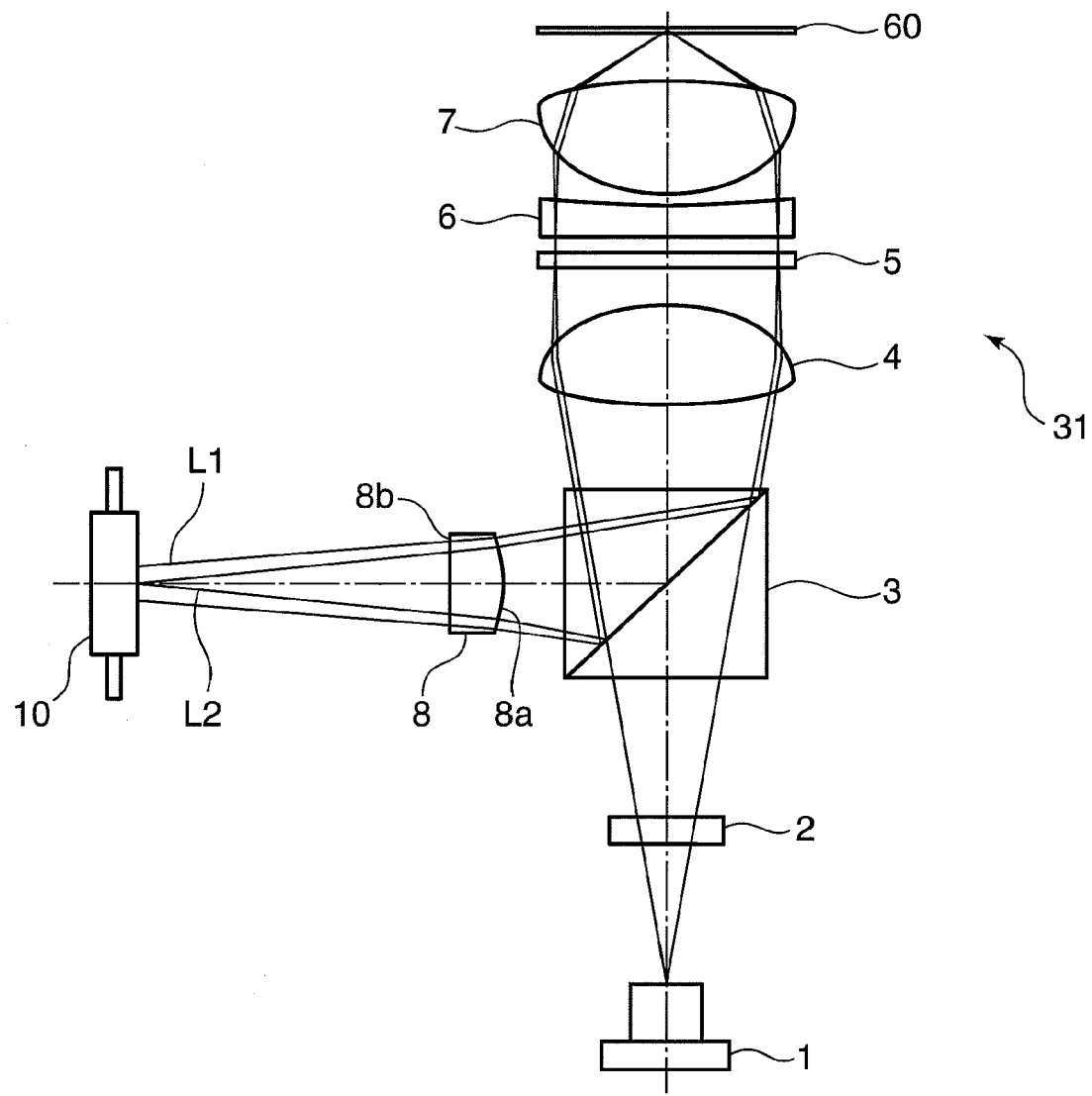
FIG. 4 is a diagram schematically showing a state of laser light reflected on the first information recording surface, and laser light reflected on the second information recording surface, in recording or reproducing from the second information recording surface in the first embodiment of the invention.

FIG. 4 is a diagram schematically showing a state of laser light L1 reflected on the first information recording surface, and laser light L2 reflected on the second information recording surface, in recording or reproducing on or from the second information recording surface of the optical disc 60.

It is obvious from FIG. 4 that since laser light L1 reflected on the first information recording surface is collected at a rearward position of the light receiving element 10, the light flux diameter of laser light L1 on the detecting lens 8 becomes larger than the light flux diameter of laser light L2 reflected on the second information recording surface, and the laser light amount Pw' per unit area in this case becomes obviously smaller than the calculated laser light amount Pw per unit area.

Accordingly, the position of the detecting lens 8 is determined based on the light flux diameters, on the detecting lens 8, of laser light L1 reflected on the first information recording surface, and of laser light L2 reflected on the second information recording surface, in recording or reproducing on or from the first information recording surface i.e. an information recording surface having a thinnest protection substrate.

As described above, in this embodiment, disposing the detecting lens 8, considering the laser light reflected on an information recording surface other than a targeted information recording surface to be used in information recording or reproducing, enables to form the detecting lens 8 of a resin having a relatively high UV resistance. Forming the detecting lens 8 of a resin enables to realize the compact and inexpensive optical head 31.

In this embodiment, the light collecting position of laser light L2 reflected on the second information recording surface having a protection substrate of 0.1 mm in thickness is obtained by paraxial calculation, and the position of the detecting lens 8 is determined based on the calculation result. It is a gist of the invention to dispose a detecting lens at such a position as to avoid an increase in the laser light amount per unit area by collection of blue-violet laser light, concerning both of reflected light from a targeted information recording surface to be used in information recording or reproducing, and reflected light from an information recording surface other than the targeted information recording surface to be used in information recording or reproducing, of a high-density optical disc having plural information recording surfaces.

Accordingly, in an actual optical system, it is important to calculate a light flux diameter, and a laser light amount per unit area on a detecting lens, considering variation of the distance Δt between information recording surfaces, the wavelength λ of blue-violet laser light, and a positional displacement of an optical component; and determine the position of the detecting lens based on the calculation result. In other words, it is needless to say that the invention embraces an optical head incorporated with a detecting lens which is disposed at such a position as to avoid an increase in the laser light amount per unit area by collection of blue-violet laser light, as well as the arrangement that the position of the detecting lens is determined based on paraxial calculation, as exemplified in this embodiment.

In this embodiment, description has been made about an arrangement that the collimator lens 4 is a single lens element. Alternatively, the formulas (9) and (10) may also be applicable, in the case where the focal length of a detecting optical system is different from the focal length of the collimator lens by interposing a relay lens or a like element, by setting a combined focal length of a lens group constituted of the collimator lens and the relay lens to fcl, and a distance (an air conversion value) between the objective lens and the principal plane of the lens group to L.

Second Embodiment

Figure 5:
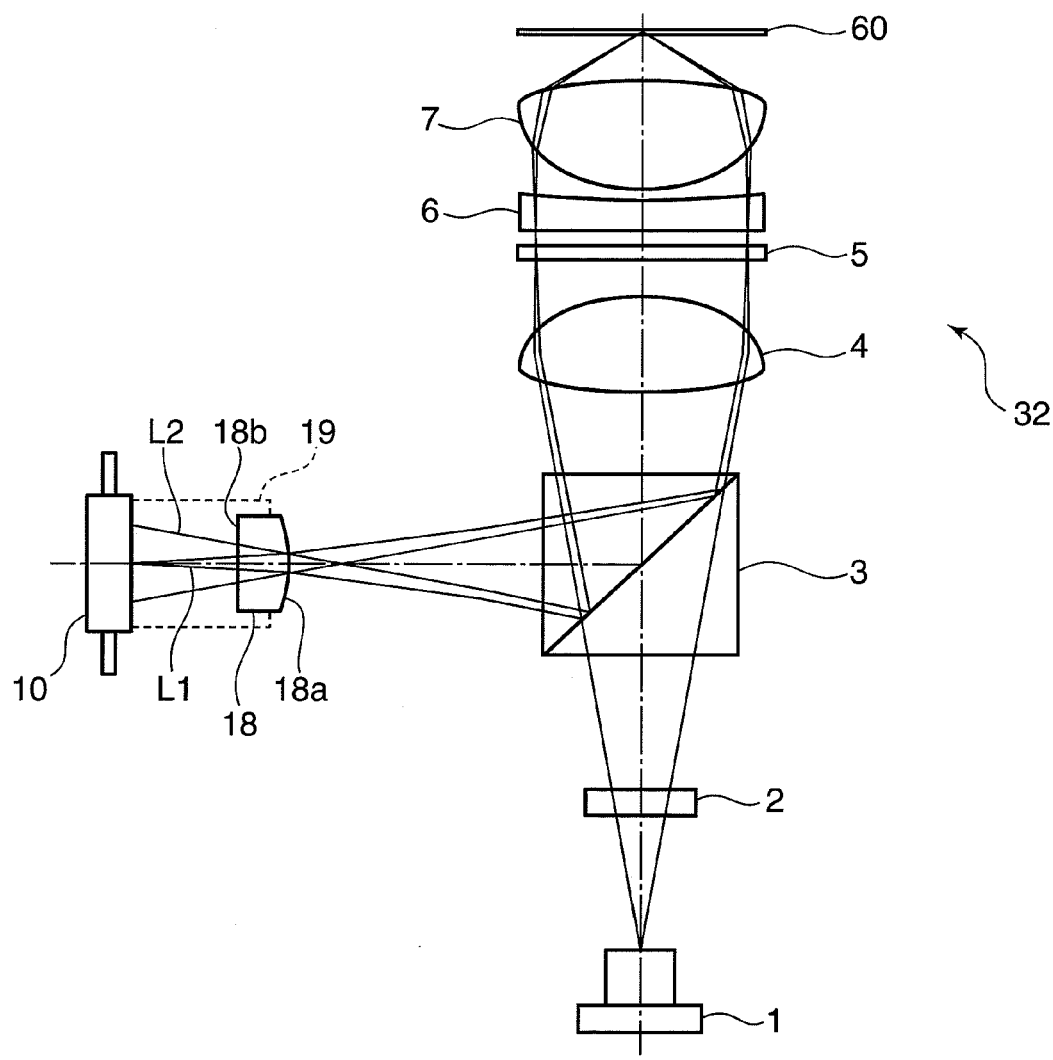
FIG. 5 is a diagram schematically showing a state of laser light reflected on a first information recording surface, and laser light reflected on a second information recording surface, in recording or reproducing from the first information recording surface in a second embodiment of the invention.

In this section, an optical head in accordance with the second embodiment of the invention is described referring to FIG. 5. FIG. 5 is a schematic construction diagram of the optical head in the second embodiment. The shape and the position of a detecting lens 18 in an optical head 32 of the second embodiment are different from those of the detecting lens 8 in the first embodiment, but the other constituent elements in the second embodiment are substantially the same as the corresponding ones in the first embodiment. Constituent elements in the second embodiment shown in FIG. 5, which are common to the constituent elements in the first embodiment, are indicated with the same reference numerals, and description thereof is omitted herein.

FIG. 5 is a diagram schematically showing a state of laser light L1 reflected on a first information recording surface, and laser light L2 reflected on a second information recording surface, in recording or reproducing on or from the first information recording surface of an optical disc 60.

The detecting lens 18 in this embodiment is disposed between the light collecting position of laser light L2 reflected on the second information recording surface, and a light receiving element 10, and is disposed at such a position that the light flux diameter of laser light L1 reflected on the first information recording surface, and the light flux diameter of laser light L2 reflected on the second information recording surface are substantially equal to each other, in recording or reproducing on or from the first information recording surface of the optical disc 60.

The light flux diameter D1 of laser light L1 reflected on the first information recording surface, and the light flux diameter D2 of laser light L2 reflected on the second information recording surface, at the above position, become 0.37 mm, respectively. Accordingly, similarly to the first embodiment, assuming that the light amount Pw1 of laser light reflected on the first information recording surface, and the light amount Pw2 of laser light reflected on the second information recording surface are respectively about 1.15 mW, the laser light amount Pw per unit area at the above position becomes:

$$Pw=21.2 \text{ (unit: mW/mm}^2\text{)}<30 \text{ (unit: mW/mm}^2\text{)}$$

On the other hand, assuming that the thickness of the detecting lens 18 is 1.0 mm, the light flux diameter D1 of laser light L1, and the light flux diameter D2 of laser light L2 on a light incident surface 18a of the detecting lens 18 become 0.43 mm and 0.31 mm, respectively. Accordingly, the laser light amount Pw to be irradiated onto the light incident surface 18a of the detecting lens 18 per unit area becomes:

$$Pw=23.2 \text{ (unit: mW/mm}^2\text{)}<30 \text{ (unit: mW/mm}^2\text{)}$$

The laser light amount to be irradiated onto a light exit surface 18b of the detecting lens 18 per unit area is substantially the same as described above.

Accordingly, in this embodiment, by disposing the detecting lens 18 at such a position that the light flux diameter of laser light L1 reflected on the first information recording surface, and the light flux diameter of laser light L2 reflected on the second information recording surface are substantially equal to each other, it is judged that the transmittance of 98% can be secured for the detecting lens 18, even after 1,000-hours recording on an information recording surface of the optical disc 60, and it is possible to mold a resin RA having a relatively high UV resistance into the detecting lens 18.

Further, the light receiving element 10 is subjected to positional adjustment in the optical axis direction to correct an offset of a focus error signal resulting from e.g. a positional displacement relative to a light source 1. The light receiving element 10 is also subjected to positional adjustment in a direction perpendicular to the optical axis so that a light collecting spot on the light receiving element 10 lies within a predetermined light receiving area. Specifically, since the light receiving element 10 is subjected to positional adjustment in three axis directions, for instance, the light receiving element 10 is adhesively fixed to an optical base (not shown) on which various optical components are mounted, without using a contact surface.

In this arrangement, preferably, the detecting lens 18 is received in a holder 19 together with the light receiving element 10 so that the holder 19 integrally holds the detecting lens 18 and the light receiving element 10, and the holder 19 is subjected to positional adjustment in three axis directions so that the detecting lens 18 and the light receiving element 10 are integrally subjected to positional adjustment.

The above arrangement enables to keep the distance between the light receiving element 10 and the detecting lens 10 constant. Accordingly, the detecting lens 18 can be easily subjected to positional adjustment with high precision at a predetermined position where the light flux diameter of laser light L1 reflected on the first information recording surface, and the light flux diameter of laser light L2 reflected on the second information recording surface are substantially equal to each other, without an influence of a positional displacement of the light source 1 or a like element.

Third Embodiment

Figure 6:
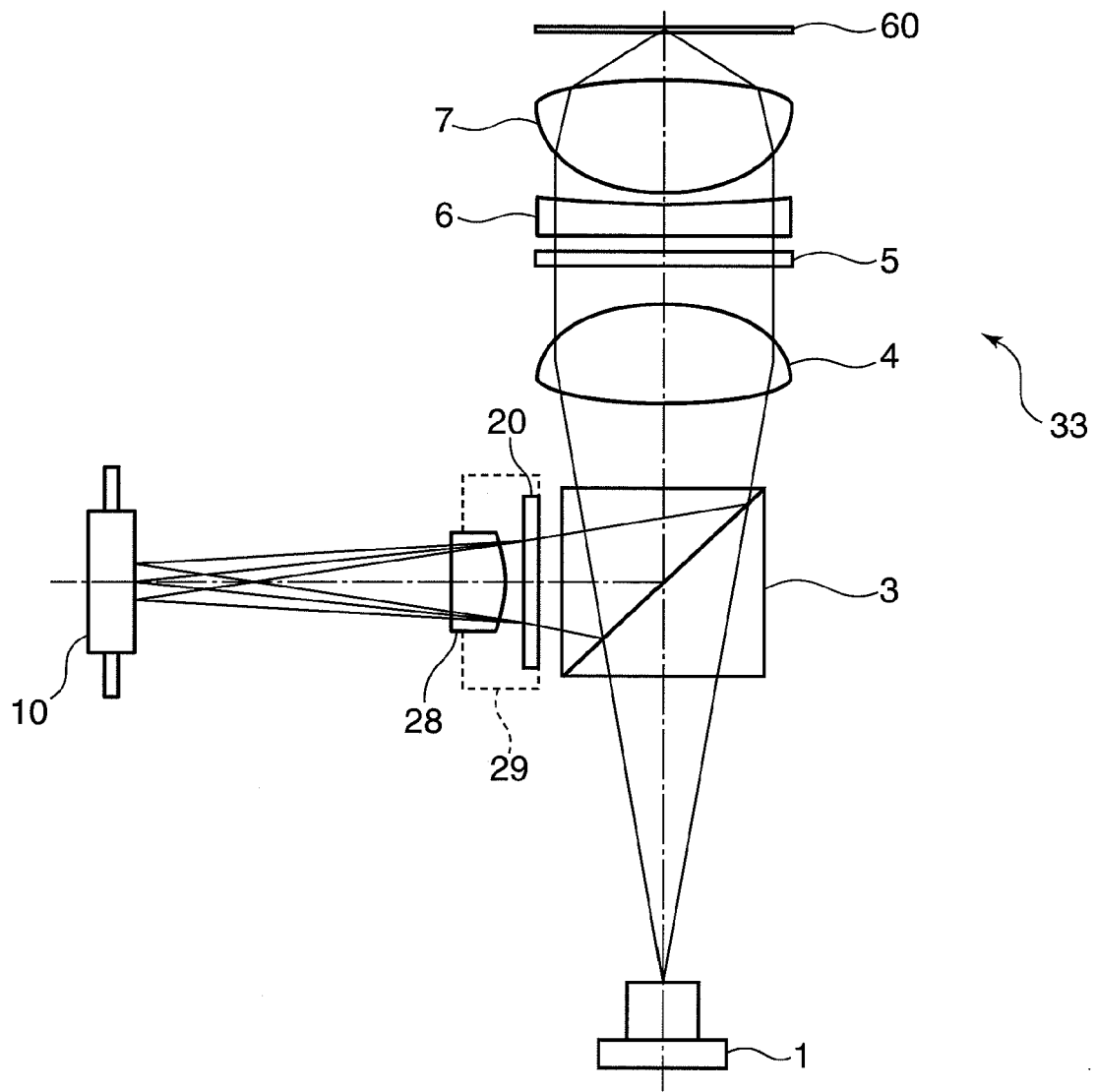
FIG. 6 is a schematic construction diagram of an optical head in a third embodiment of the invention.
Figure 7:
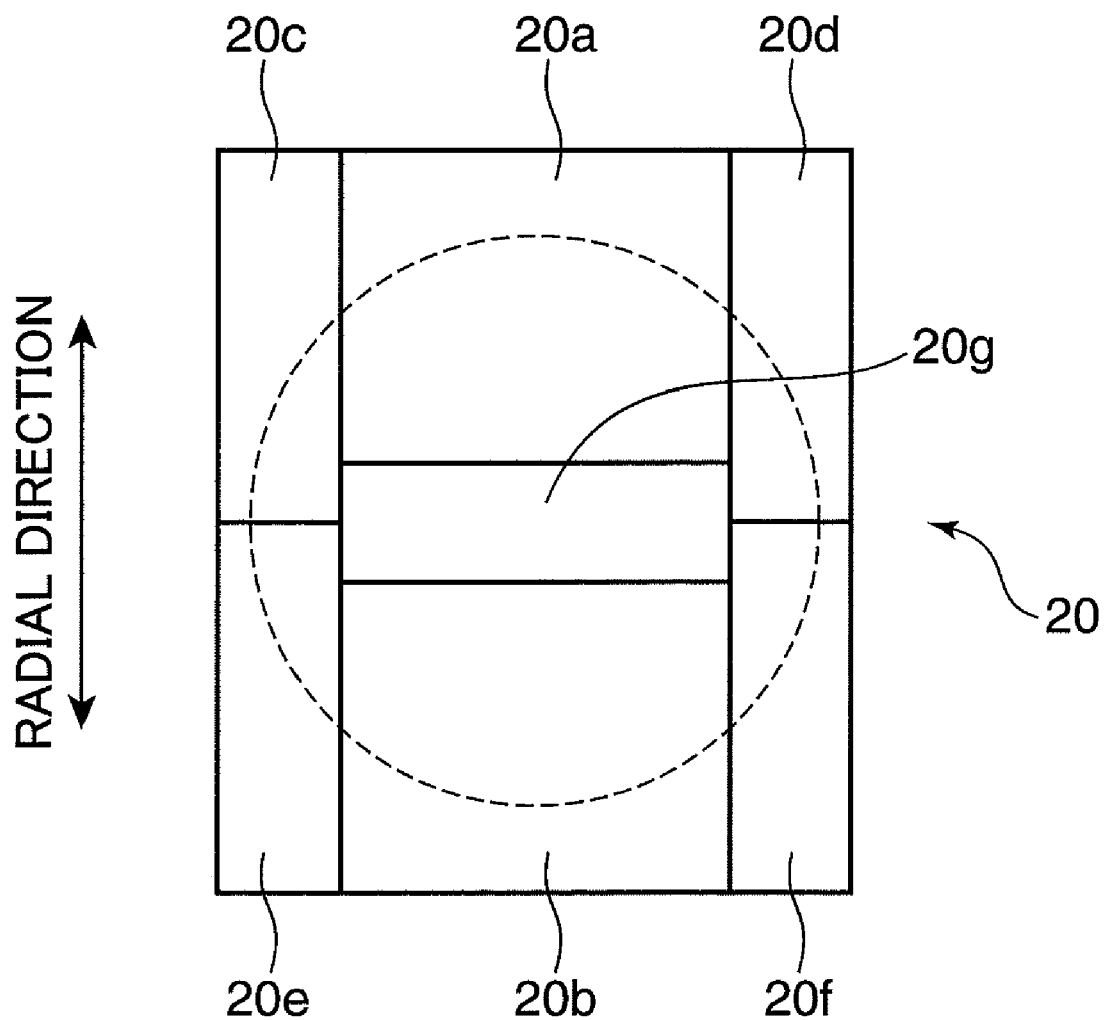
FIG. 7 is a diagram showing a light flux dividing pattern of DOE in the third embodiment of the invention.
Figure 8:
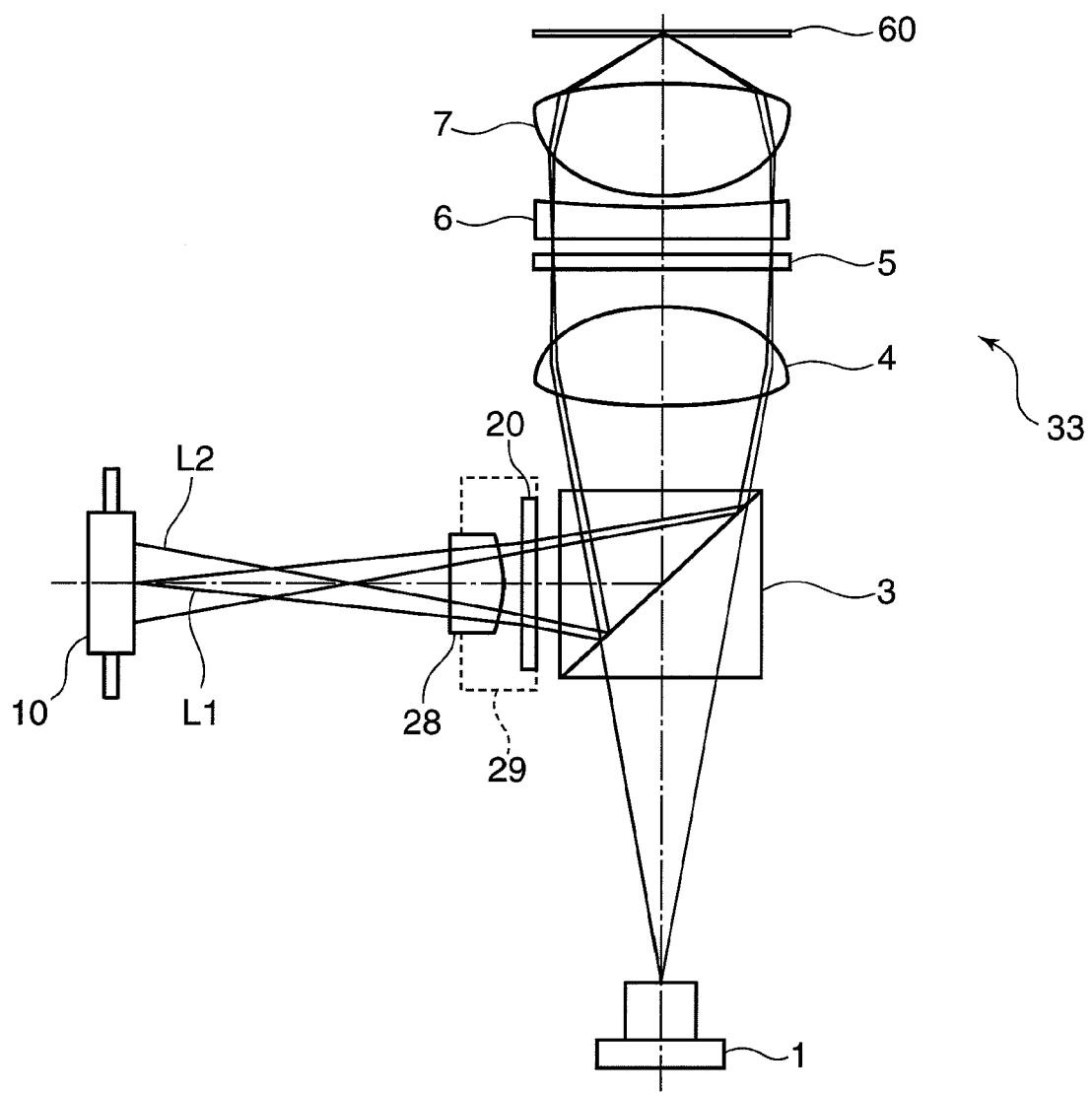
FIG. 8 is a diagram schematically showing a state of laser light reflected on a first information recording surface, and laser light reflected on a second information recording surface, in recording or reproducing from the first information recording surface in the third embodiment of the invention.

In this section, an optical head in accordance with the third embodiment of the invention is described referring to FIGS. 6 through 8. FIG. 6 is a schematic construction diagram of the optical head in the third embodiment of the invention. The third embodiment is different from the first embodiment and the second embodiment in the points that an optical head 33 in the third embodiment is not provided with a diffraction grating 2, and a DOE (Diffractive Optical Element) 20 as a light flux dividing element is disposed between a polarized beam splitter 3 and a detecting lens 28. Constituent elements in the third embodiment shown in FIG. 6, which are common to the constituent elements in the first embodiment and the second embodiment, are indicated with the same reference numerals, and description thereof is omitted herein.

An operation of the optical head 33 for recording or reproducing information on or from an optical disc 60 is described referring to FIG. 6. Blue-violet laser light emitted from a light source 1 is transmitted through the polarized beam splitter 3, and converted into substantially parallel light by a collimator lens 4. The blue-violet laser light converted into substantially parallel light is then converted from linearly polarized light into circularly polarized light by a quarter wave plate 5, transmitted through an achromatic lens 6, and collected on an information recording surface of the optical disc 60 as a light spot through a protection substrate by an objective lens 7.

The laser light reflected on the information recording surface of the optical disc 60 is transmitted through the objective lens 7 and the achromatic lens 6, converted into linearly polarized light different from the incoming path by the quarter wave plate 5, transmitted through the collimator lens 4, and reflected on the polarized beam splitter 3. After the reflected laser light is divided into zero-order light and ±first-order diffracted light by the DOE 20, the laser light is subjected to astigmatism by the detecting lens 28, and guided to a light receiving element 10, where an information signal and a servo signal are generated.

In this example, as a method for detecting a focus error signal, there is used e.g. a so-called astigmatism method, wherein zero-order light subjected to astigmatism by the detecting lens 28 is detected and obtained using a four-divided light receiving pattern. A tracking error signal is generated by detecting the +first-order diffracted light obtained by dividing a light flux into a predetermined pattern using the DOE 20, by the light receiving element 10, and performing e.g. a computation to be described later.

FIG. 7 is a diagram schematically showing a light flux dividing pattern by the DOE 20. The broken line in FIG. 7 indicates a light flux diameter, on the DOE, of laser light reflected on an information recording surface of the optical disc 60.

The DOE 20 has seven different kinds of areas 20a through 20g, and divides incident laser light into zero-order diffracted light and ±first-order diffracted light. A tracking error signal TE is obtained by performing the following computation, using current signals Ia through Ig in accordance with the light amounts of +first-order light diffracted on the respective areas 20a through 20g:

$TE=(Ia-Ib)-k(Ic+Id-Ie-If)$

FIG. 8 is a diagram schematically showing a state of laser light L1 reflected on a first information recording surface, and laser light L2 reflected on a second information recording surface, in recording or reproducing on or from the first information recording surface of the optical disc 60.

As shown in FIG. 8, the detecting lens 28 in this embodiment is disposed at such a position that both of laser light L1 reflected on the first information recording surface, and laser light L2 reflected on the second information recording surface are not collected. Similarly to the first embodiment, since the light flux diameter of laser light to be transmitted through the detecting lens 28 is large, and the laser light amount per unit area is small, it is possible to form the detecting lens 28 of a resin RA having a relatively high UV resistance.

In this example, the DOE 20 is subjected to positional adjustment with respect to a light flux of laser light reflected on the first or the second information recording surface. The detecting lens 28 may be received in a holder 29 together with the DOE 20 so that the holder 29 integrally holds the detecting lens 28 and the DOE 20, and the holder 29 may be subjected to positional adjustment so that the detecting lens 28 and the DOE 20 are integrally subjected to positional adjustment. As a result, the distance between the detecting lens and the DOE 20 can be reduced, and the detecting lens 28 can be disposed at a position where the light flux diameter of laser light is increased, i.e. a position closer to the polarized beam splitter 3.

Further, the light receiving element 10 is subjected to positional adjustment in the optical axis direction to correct an offset of a focus error signal resulting from e.g. a positional displacement relative to the light source 1. The light receiving element 10 is also subjected to positional adjustment in a direction perpendicular to the optical axis so that a light collecting spot on the light receiving element 10 lies within a predetermined light receiving area. Specifically, since the light receiving element 10 is subjected to positional adjustment in three axis directions, for instance, preferably, the light receiving element 10 is adhesively fixed to an optical base (not shown) on which various optical components are mounted, without using a contact surface.

Thus, in this embodiment, there is no need of securing an adjustment range for the detecting lens 28 in the optical axis direction, and the detecting lens 28 can be disposed closer to the polarized beam splitter 3. This arrangement enables to increase the light flux diameter of laser light to be transmitted through the detecting lens 28, and reduce the laser light amount per unit area, while miniaturizing the optical head 33.

Fourth Embodiment

Figure 9:
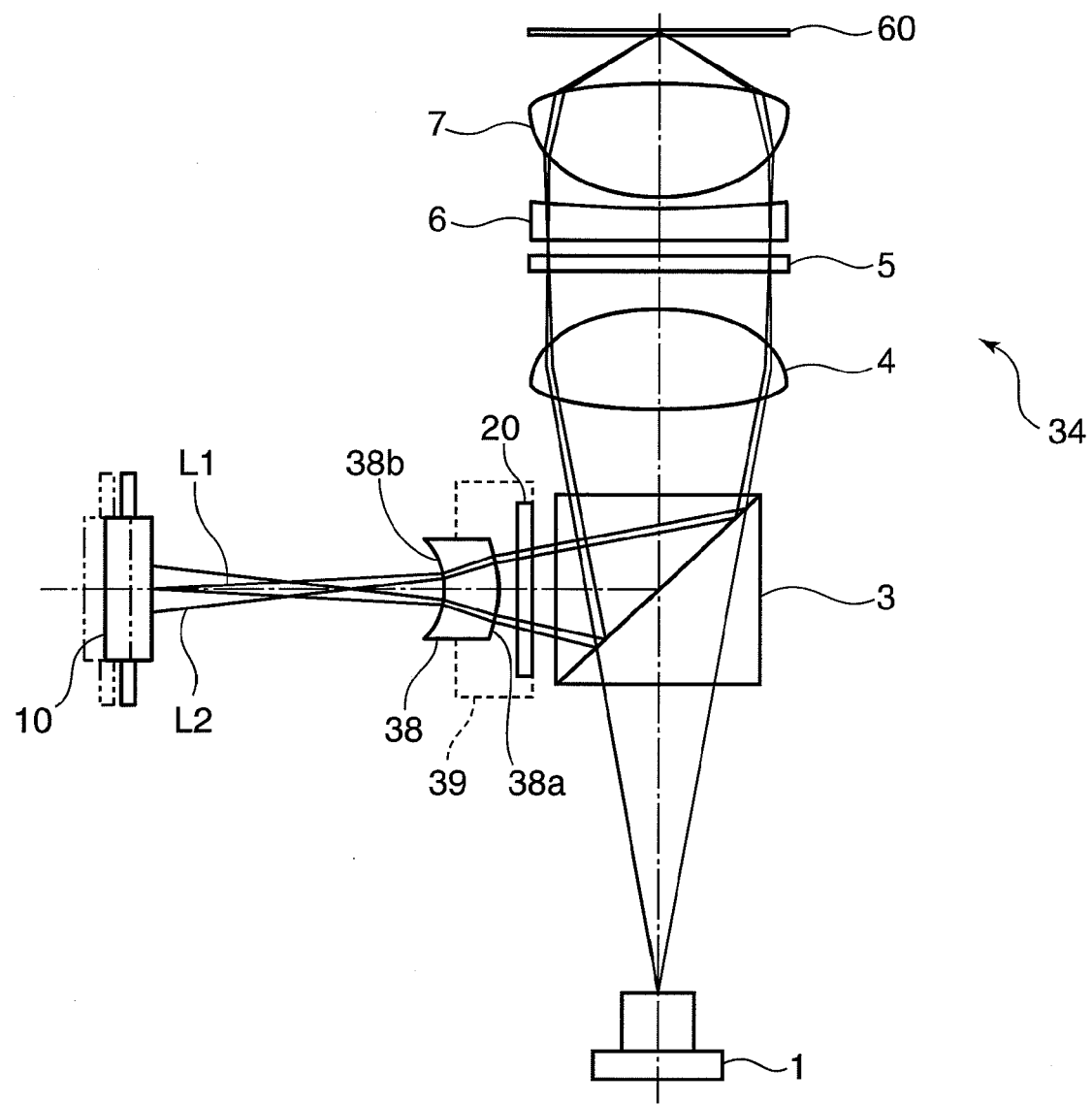
FIG. 9 is a diagram schematically showing a state of laser light reflected on a first information recording surface, and laser light reflected on a second information recording surface, in recording or reproducing from the first information recording surface in a fourth embodiment of the invention.

In this section, an optical head in accordance with the fourth embodiment of the invention is described referring to FIGS. 9 through 12. FIG. 9 is a schematic construction diagram of the optical head in the fourth embodiment of the invention. An optical head 34 in this embodiment is different from the optical head 33 in the third embodiment in a point that a light incident surface 38a and a light exit surface 38b of a detecting lens 38 are each formed into a toric surface, unlike the detecting lens 28 in the third embodiment. Constituent elements in the embodiment shown in FIG. 9, which are common to the constituent elements in the first embodiment, the second embodiment, and the third embodiment, are indicated with the same reference numerals, and description thereof is omitted herein.

As shown in FIG. 9, the detecting lens 38 in this embodiment is disposed at such a position that both of laser light L1 reflected on a first information recording surface, and laser light L2 reflected on a second information recording surface are not collected. Similarly to the third embodiment, the light flux diameter of laser light to be transmitted through the detecting lens 38 is increased, and the laser light amount per unit area is reduced. Accordingly, it is possible to form the detecting lens 38 of a resin RA having a relatively high UV resistance.

In this example, as a method for detecting a focus error signal, there is used e.g. a so-called astigmatism method, wherein zero-order light subjected to astigmatism by the detecting lens 38 is detected and obtained using a four-divided light receiving pattern. Since the light incident surface 38a and the light exit surface 38b of the detecting lens 38 are each formed into a toric surface, a focal length and a focal line position with respect to each of two axes orthogonal to each other and constituting a front side focal line and a rear side focal line to be used by an astigmatism method can be substantially desirably set.

Figure 10:
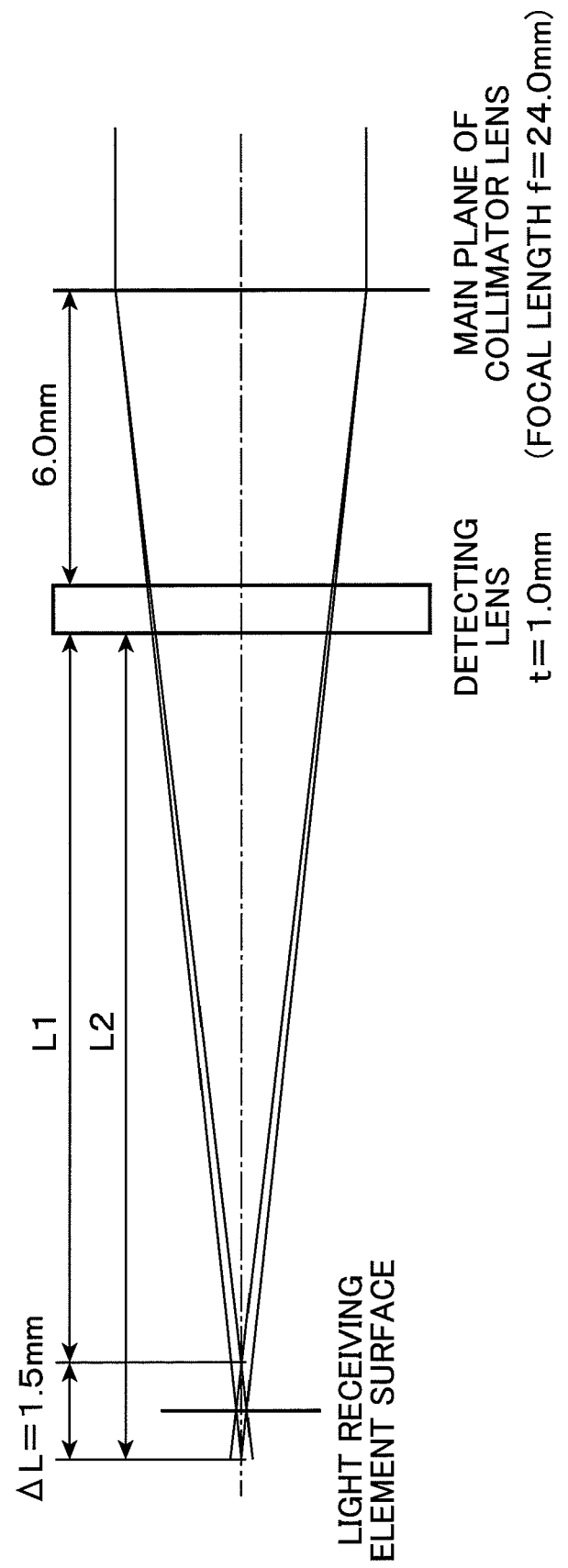
FIG. 10 is a diagram schematically showing a detecting optical system of the invention.

For instance, in a detecting optical system (a focal length fave of a detecting system=25.0 mm, a distance ΔL between focal lines=1.5 mm) as shown in FIG. 10, the detecting lens 28 having a cylindrical surface described in the third embodiment satisfies the following:

curvature radius of light incident surface: −117 mm×∞ (cylindrical surface), and curvature radius of light exit surface: ∞×∞(flat surface)

Then, the distance L1 from the light exit surface of the detecting lens 28 to the front side focal line, the distance L2 from the light exit surface of the detecting lens 28 to the rear side focal line, and the focal lengths f1 and f2 respectively corresponding to the front side focal line and the rear side focal line become:

L1=17.3 mm, f1=24.0 mm, and

L2=18.8 mm, f2=26.0 mm.

In the case where the light exit surface of the detecting lens 28 is defined as a flat surface, there is substantially no design freedom, and the curvature radius of the light incident surface of the detecting lens 28 is uniquely determined by the focal length fave of the detecting system, and the distance ΔL between the focal lines.

On the other hand, assuming that the curvature radiuses of a light incident surface and a light exit surface of the detecting lens 38 each having a toric surface in this embodiment satisfy the following:

curvature radius of light incident surface: 2.15×4.01 mm (toric surface), and curvature radius of light exit surface: 1.72×3.47 mm (toric surface), the distance L1 from the light exit surface of the detecting lens 38 to the front side focal line, the distance L2 from the light exit surface of the detecting lens 38 to the rear side focal line, and the focal lengths f1 and f2 respectively corresponding to the front side focal line and the rear side focal line become:

L1=15.0 mm, f1=25.0 mm, and

L2=16.5 mm, f2=25.0 mm.

Further, for instance, it is possible to design a detecting lens satisfying the following:

curvature radius of light incident surface: 1.56×1.94 mm (toric surface)

curvature radius of light exit surface: 1.14×1.49 mm (toric surface)

L1=15.0 mm, f1=28.0 mm, and

L2=16.5 mm, f2=28.0 mm.

As described above, for instance, even in the case where the detection magnification is increased (the focal length of the detecting system is increased) to reduce an influence, on the light receiving element 10, of interference between laser light reflected on the first information recording surface, and laser light reflected on the second information recording surface, this embodiment is advantageous in reducing the distance from the detecting lens 38 to the light receiving element 10. Thereby, the optical head 34 can be made compact. In other words, it is preferable to set a back focus distance of the detecting lens 38 smaller than the back focus distance of a lens having a focal length substantially equal to the focal length of the detecting lens 38, and having at least one cylindrical surface.

Figure 11:
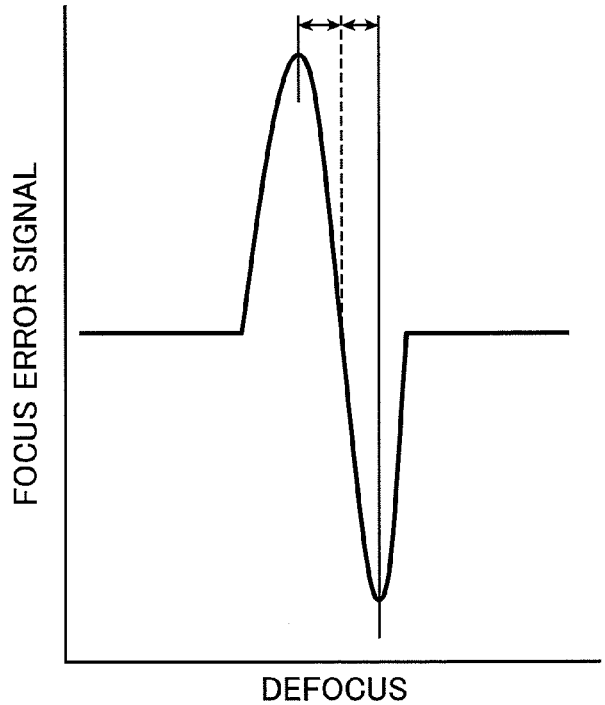
FIG. 11 is a diagram schematically showing a waveform of a focus error signal, in the case where a detecting lens having a cylindrical surface is used.
Figure 12:
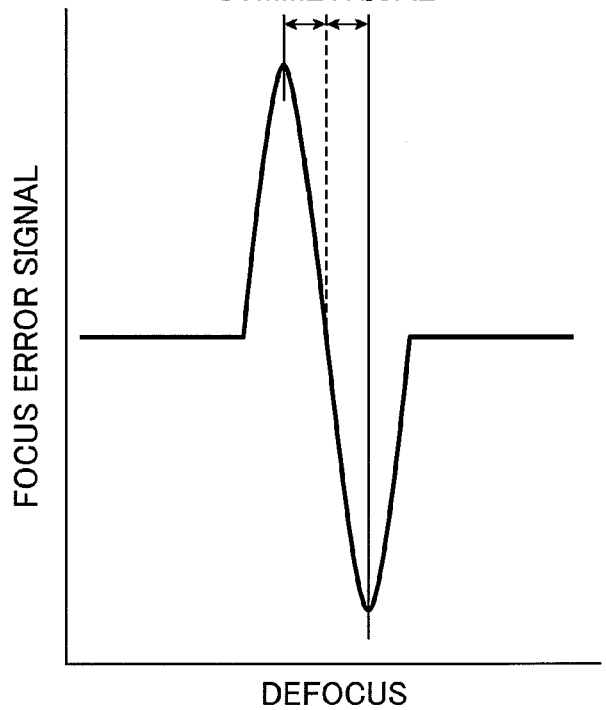
FIG. 12 is a diagram schematically showing a waveform of a focus error signal from an optical head in the fourth embodiment of the invention.

In the detecting lens 28 having a cylindrical surface, as shown in FIG. 11, a focus error signal (so-called S-shaped signal) to be outputted from a detecting optical system is asymmetrically varied with respect to a defocus (so-called focus displacement), and linearity of the focus error signal near a focal point is impaired. On the other hand, in the detecting lens 38 having a toric surface in this embodiment, since the focal length f1 of the front side focal line and the focal length f2 of the rear side focal line are made equal to each other, as shown in FIG. 12, a focus error signal (so-called S-shaped signal) to be outputted from the detecting optical system in this embodiment is symmetrically varied with respect to a defocus (so-called focus displacement), and linearity of the focus error signal near a focal point is made satisfactory.

Further, since the shape of a die for forming a lens having a toric surface such as the detecting lens 38 in this embodiment is complicated, as compared with forming a lens having a cylindrical surface, it is desirable to mold the detecting lens 38 of a resin. In this embodiment, the detecting lens 38 is disposed at such a position that both of laser light L1 reflected on the first information recording surface, and laser light L2 reflected on the second information recording surface are not collected, in other words, a position between the light collecting position of laser light L2 reflected on the second information recording surface, and the polarized beam splitter 3. Accordingly, the detecting lens 38 can be made of a resin RA having a relatively high UV resistance, and the detecting lens 38 having a toric surface can be easily fabricated. In particular, in the case where recording or reproducing on or from an optical disc having plural information recording surfaces is performed by an optical head using blue-violet laser light of about 400 nm wavelength, the arrangement of this embodiment is very effective, because a resinous lens having a toric surface can be used as a detecting lens.

As described above, in the first through the fourth embodiments, description has been made about the arrangement examples, wherein the detecting lens is disposed at such a position as to avoid an increase in the laser light amount per unit area by collection of blue-violet laser light, concerning both of reflected light from a targeted information recording surface to be used in information recording or reproducing, and reflected light from an information recording surface other than the targeted information recording surface to be used in information recording or reproducing, of the high-density optical disc 60 having two layers of information recording surfaces with protection substrate thicknesses of 0.075 mm and 0.1 mm. The invention is not limited to these arrangements.

For instance, it is obvious that the invention embraces an arrangement of disposing a resinous detecting lens at such a position as to avoid an increase in the laser light amount per unit area by collection of blue-violet laser light, concerning reflected light from a targeted information recording surface to be used in information recording or reproducing, and reflected light from information recording surfaces other than the targeted information recording surface to be used in information recording or reproducing, of an optical disc having three or more layers of information recording surfaces.

In other words, in the optical disc having three or more layers of information recording surfaces, reflected light from the information recording surfaces other than a targeted information recording surface to be used in information recording or reproducing is collected at plural sites. In this case, it is important to determine the position of the detecting lens so that the sum of laser light amounts of all the reflected light per unit area is equal to or smaller than a predetermined value e.g. 30 mW/mm$^2$, while avoiding all the light collecting points.

For instance, in an optical disc having three layers of information recording surfaces i.e. first through third information recording surfaces, let it be assumed that the third information recording surface having a thickest protection substrate is La0, the second information recording surface having a second thickest protection substrate is La1, and the first information recording surface having a thinnest protection substrate is La2. In the optical disc having the above construction, in the case where the information recording surface to be used in information recording or reproducing is defined as the third information recording surface La0, reflected light from the other information recording surfaces is not collected at a forward position of the light receiving element.

On the other hand, in the case where the information recording surface to be used in information recording or reproducing is defined as the second information recording surface La1, reflected light from the third information recording surface La0 is collected at a forward position of the light receiving element. In the case where the information recording surface to be used in information recording or reproducing is defined as the first information recording surface La2, both of the reflected light from the third information recording surface La0 and the reflected light from the second information recording surface La1 are collected at a forward position of the light receiving element.

Accordingly, in the case where the light collecting position of reflected light from the third information recording surface La0, and the light collecting position of reflected light from the second information recording surface La1 are located between the light receiving element and the polarized beam splitter, when the targeted information recording surface to be used in information recording or reproducing is defined as the first information recording surface La2, it is preferable to dispose the detecting lens between the light collecting position of reflected light from the third information recording surface La0, and the polarized beam splitter. In this arrangement, since the light collecting positions of all the reflected light are located between the detecting lens and the light receiving element, the light flux diameter of all the reflected light to be transmitted through the detecting lens is maximized, and the laser light amount per unit area is minimized.

In the case where the distance between the light collecting position of reflected light from the third information recording surface La0, and the polarized beam splitter is not sufficient to dispose the detecting lens, it is preferable to dispose the detecting lens at an intermediate position between the light collecting position of reflected light from the third information recording surface La0, and the light collecting position of reflected light from the second information recording surface La1. In this arrangement, the light collecting positions of all the reflected light are located outside the detecting lens, and the detecting lens is disposed on the side of the polarized beam splitter. Accordingly, the light flux diameter of all the reflected light to be transmitted through the detecting lens is increased, and the laser light amount per unit area is reduced.

Similarly to the above, in an optical disc having four or more layers of information recording surfaces, in the case where a targeted information recording surface to be used in information recording or reproducing is defined as the information recording surface having a thinnest protection substrate, reflected light from all the other information recording surfaces is collected at a forward position of the light receiving element. Accordingly, it is most preferable to dispose the detecting lens at such a position away from all the light collecting positions, for instance, at a position between the light collecting position of reflected light from the information recording surface having a thickest protection substrate, and the polarized beam splitter. Unless otherwise, it is preferable to dispose the detecting lens at an intermediate position between the light collecting position of reflected light from a predetermined information recording surface, and the light collecting position of reflected light from another predetermined information recording surface.

In the foregoing, description has been made about an optical disc having two layers of information recording surfaces, an optical disc having three layers of information recording surfaces, and an optical disc having four or more layers of information recording surfaces. Obviously, in any of the cases, it is preferable to dispose the detecting lens at a position closer to the polarized beam splitter, in disposing the detecting lens between the light receiving element and the polarized beam splitter. Specifically, assuming that the distance between the light receiving surface of the light receiving element, and the light exit surface of the polarized beam splitter is d1, preferably, the distance d2 between the light exit surface of the polarized beam splitter, and the detecting lens satisfies the following formula, where td is a thickness of the detecting lens:

$$d1/2 > d2 + td/2$$

The detecting lenses in the first through the fourth embodiments are a so-called anamorphic lens for imparting astigmatism to laser light to obtain a focus error signal by an astigmatism method. The invention is not specifically limited to this example. For instance, the invention is applicable to a relay lens for changing a convergent angle of laser light emitted from a collimator lens (in other words, changing a focal length).

Specifically, similarly to the anamorphic lens, disposing a lens at such a position as to avoid an increase in the laser light amount per unit area by collection of blue-violet laser light, concerning both of reflected light from a targeted information recording surface to be used in information recording or reproducing, and reflected light from an information recording surface other than the targeted information recording surface to be used in information recording or reproducing, enables to use a relay lens made of a resin, thereby realizing a compact and inexpensive arrangement by using the relay lens made of a resin.

Further, in the first through the fourth embodiments, description has been made about an arrangement provided with the collimator lens 4 for converting blue-violet laser light emitted from the light source 1 into substantially parallel light. The invention is not limited to the above arrangement.

For instance, in the case where emitted light from the collimator lens 4 is incident into the objective lens 7 as divergent light or convergent light by allowing direct incidence of laser light emitted from the light source 1 into the objective lens 7, providing a relay lens for changing a divergent angle of laser light emitted from the light source 1, or moving the collimator lens 4 in the optical axis direction, it is needless to say that the invention embraces an optical head incorporated with a detecting lens, which is disposed at such a position as to avoid an increase in the laser light amount per unit area by collection of blue-violet laser light, concerning both of reflected light from a targeted information recording surface to be used in information recording or reproducing, and reflected light from an information recording surface other than the targeted information recording surface to be used in information recording or reproducing, even in use of a so-called finite optical system.

In the first through the fourth embodiments, description has been made about the arrangement examples, wherein the detecting lens is disposed at such a position as to avoid an increase in the laser light amount per unit area by collection of blue-violet laser light, using blue-violet laser light of about 400 nm wavelength, as a light source. It is known, however, the light transmittance of a resinous optical component is gradually lowered in a region of 430 nm wavelength or less, e.g. a UV region where the wavelength is shorter than 430 nm. In view of this, the invention embraces an arrangement, wherein UV light of 430 nm wavelength or less is used as a light source.

Fifth Embodiment

Figure 13:
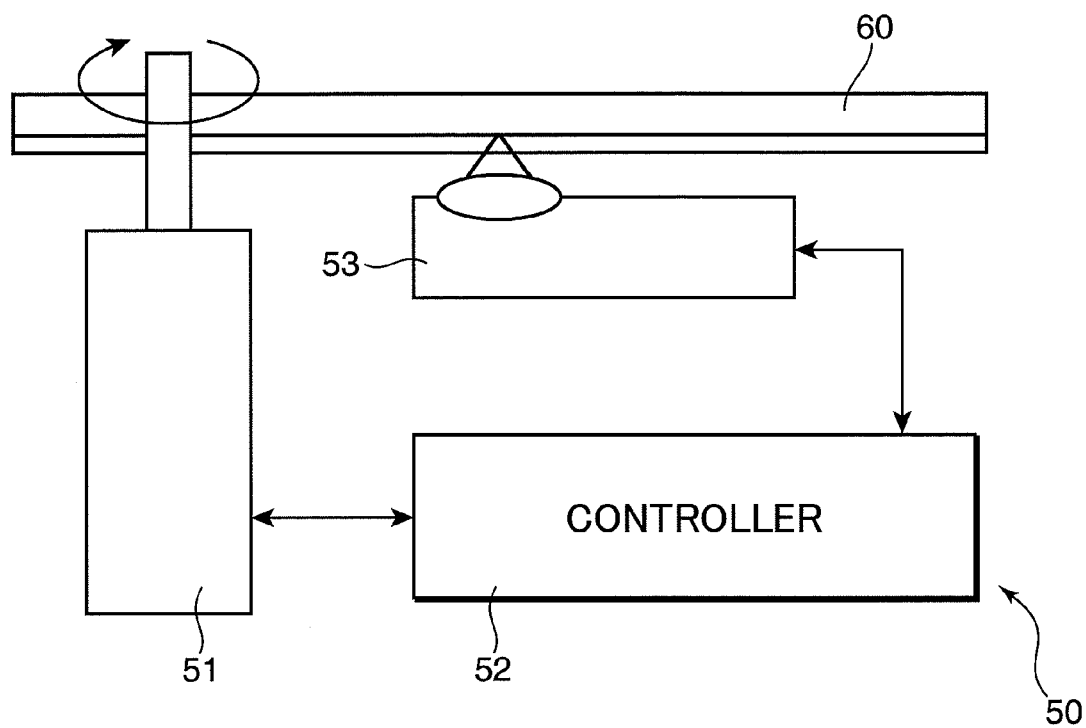
FIG. 13 is a schematic construction diagram of an optical disc device in a fifth embodiment of the invention.

FIG. 13 is a schematic construction diagram of an optical disc device in the fifth embodiment of the invention. Referring to FIG. 13, the reference numeral 50 indicates the optical disc device. The optical disc device 50 internally includes an optical disc driver 51, a controller 52, and an optical head 53.

The optical disc driver 51 is constituted of a motor, and has a function of rotatably driving an optical disc 60. The optical head 53 is any one of the optical heads described in the first through the fourth embodiments. The controller 52 has a function of driving and controlling the optical disc driver 51 and the optical head 53, a function of subjecting a control signal and an information signal generated from light received on the optical head 53 to signal processing, and a function of interfacing the information signal between the interior and the exterior of the optical disc device 50.

As described above, since the optical disc device 50 has any one of the optical heads described in the first through the fourth embodiments, the optical disc device 50 in this embodiment can be produced in a small size and at a low cost.

Sixth Embodiment

Figure 14:
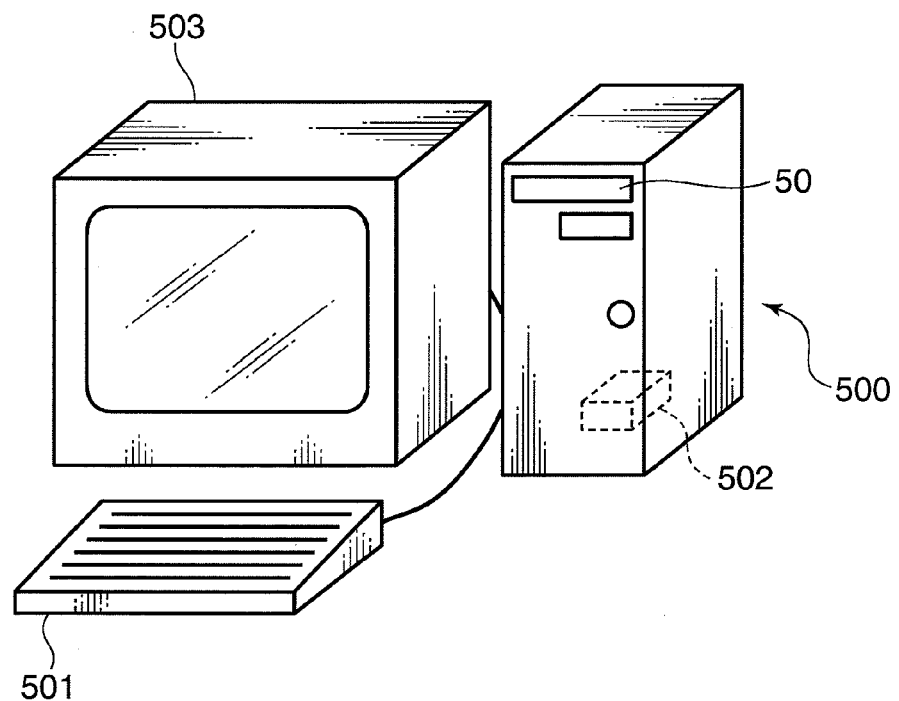
FIG. 14 is a schematic construction diagram of a computer in a sixth embodiment of the invention.

FIG. 14 is a schematic construction diagram of a computer in the sixth embodiment of the invention. Referring to FIG. 14, a computer 500 includes the optical disc device 50 in the fifth embodiment, an input device 501 for allowing a user to input information, such as a keyboard, a mouse, or a touch panel, a computing device 502 such as a central processing unit (CPU) for performing a computation based on the information inputted through the input device 501, information read from the optical disc device 50, or the like, and an output device 503 such as a CRT or a liquid crystal display device (or a printer) for displaying information such as a computation result by the computing device 502.

As described above, since the computer 500 has the optical disc device 50 in the fifth embodiment, the computer 500 can be realized in a small size and at a low cost, and can be used in a wide range.

Seventh Embodiment

Figure 15:
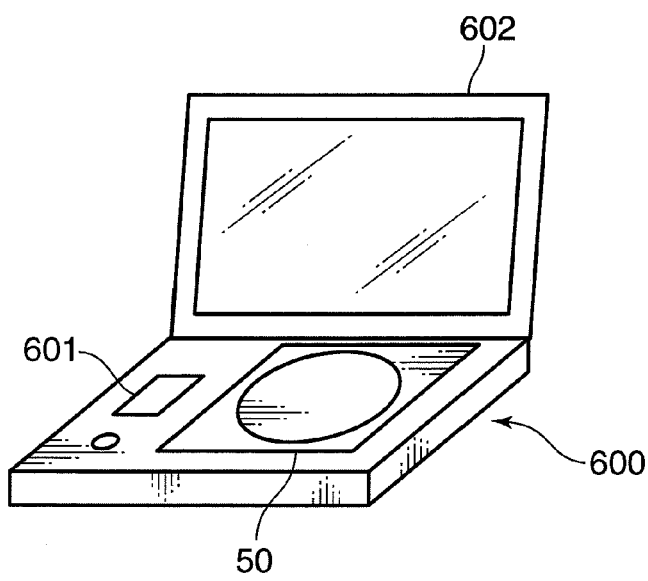
FIG. 15 is a schematic construction diagram of an optical disc player in a seventh embodiment of the invention.

FIG. 15 is a schematic construction diagram of an optical disc player in the seventh embodiment of the invention. Referring to FIG. 15, the optical disc player 600 includes the optical disc device 50 in the fifth embodiment, and an information-to-image converting device 601 (e.g. a decoder) for converting an information signal obtained from the optical disc device 50 into an image signal.

The optical disc player 600 is also usable as a car navigation system by adding a position sensor such as a GPS and a central processing unit (CPU). Further, an arrangement provided with a display device 602 such as a liquid crystal monitor may also be applicable.

As described above, since the optical disc player 600 has the optical disc device 50 in the fifth embodiment, the optical disc player 600 can be realized in a small size and at a low cost, and can be used in a wide range.

Eighth Embodiment

Figure 16:
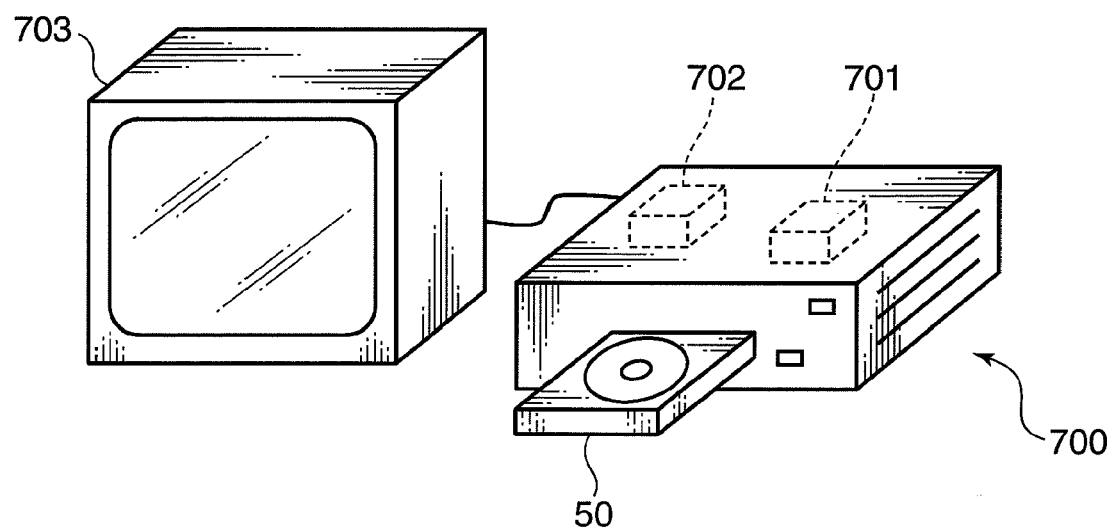
FIG. 16 is a schematic construction diagram of an optical disc recorder in an eighth embodiment of the invention.
Figure 17:
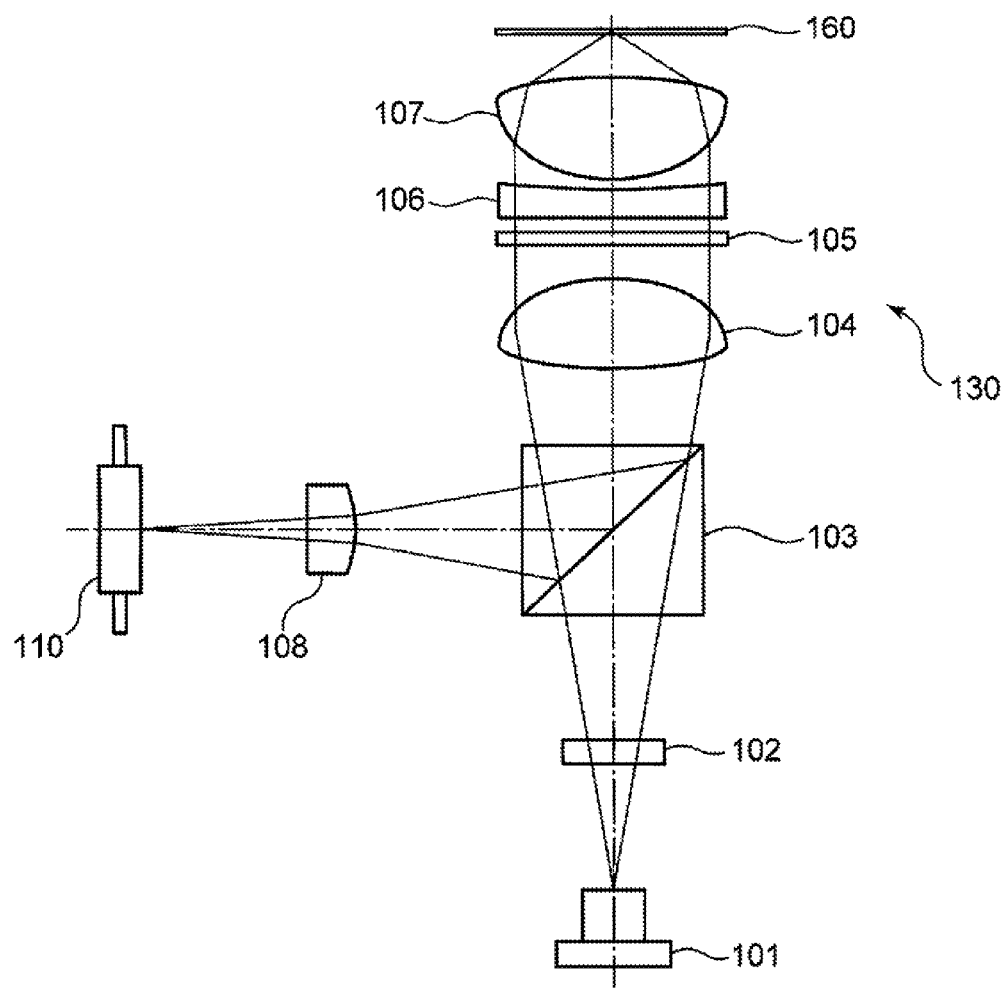
FIG. 17 is a schematic construction diagram of a conventional optical head.
Figure 18:
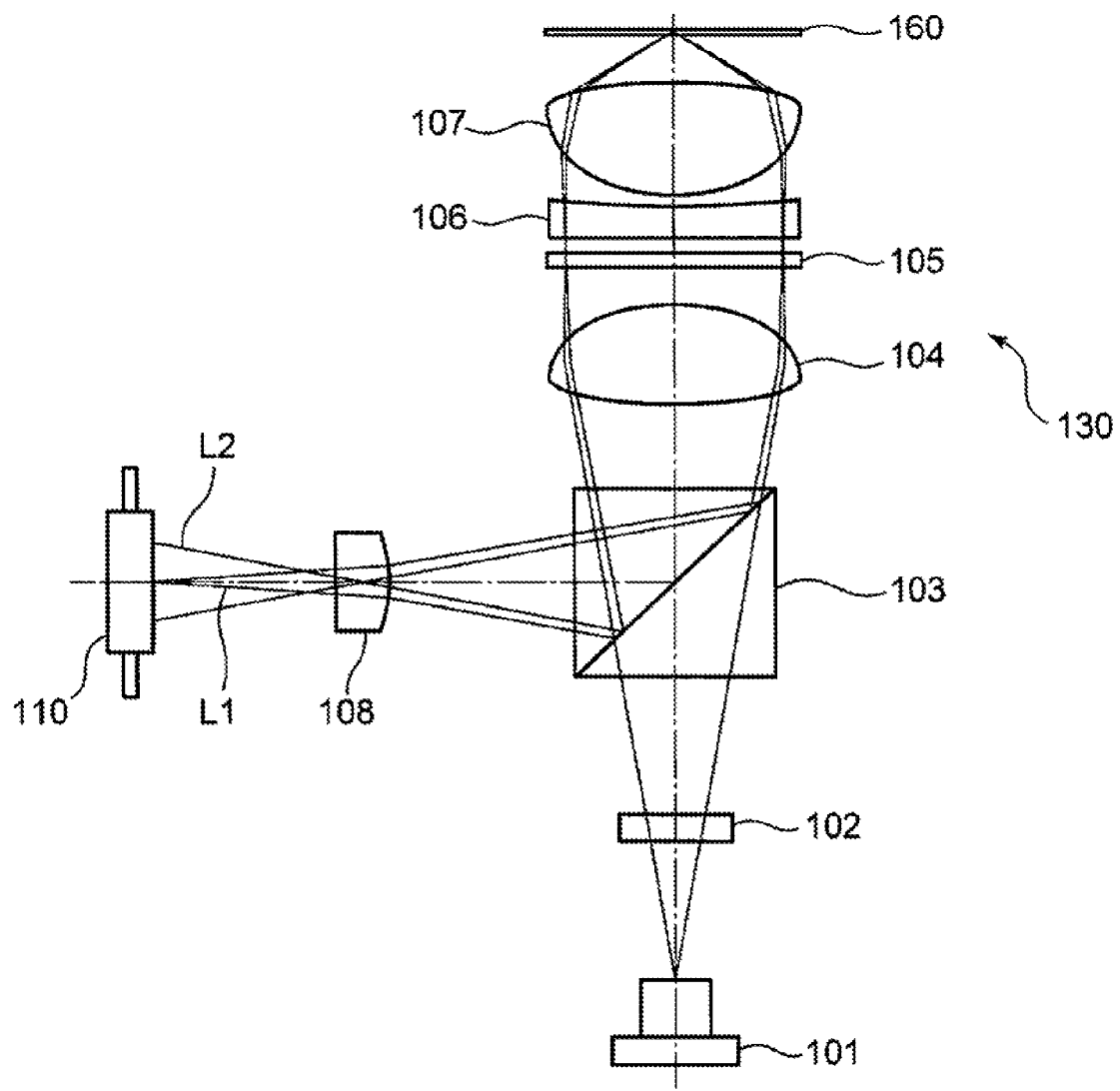
FIG. 18 is a diagram schematically showing a state of laser light reflected on a first information recording surface, and laser light reflected on a second information recording surface, in recording or reproducing from the first information recording surface in the conventional optical head.

FIG. 16 is a schematic construction diagram of an optical disc recorder in the eighth embodiment of the invention. Referring to FIG. 16, the optical disc recorder 700 includes the optical disc device 50 in the fifth embodiment, and an image-to-information converting device 701 (e.g. an encoder) for converting image information into an information signal to be recorded on an optical disc by the optical disc device 50. Preferably, the optical disc recorder 700 may include an information-to-image converting device 702 (e.g. a decoder) for converting an information signal to be obtained from the optical disc device 50 into image information. Thereby, a recorded image is reproducible. Further alternatively, an output device 703 such as a CRT or a liquid crystal display device (or a printer) for displaying information may be additionally provided.

As described above, since the optical disc recorder 700 has the optical disc device 50 in the fifth embodiment, the optical disc recorder 700 can be realized in a small size and at a low cost, and can be used in a wide range.

The following is a summary of the embodiments of the invention. Specifically, an optical head according to an aspect of the invention includes: a light source for emitting laser light of 430 nm wavelength or less; an objective lens for collecting the laser light emitted from the light source on an information recording medium having plural information recording surfaces; a light receiving element for receiving laser light reflected on the information recording medium; and a detecting lens for guiding the laser light reflected on the information recording medium to the light receiving element, wherein the detecting lens is made of a resin material, and the detecting lens is disposed at such a position that a light collecting position of the laser light reflected on an information recording surface different from an information recording surface having a thinnest protection substrate, among the plural information recording surfaces of the information recording medium, is located outside the detecting lens, in recording or reproducing on or from the information recording surface having the thinnest protection substrate.

In the optical head, the detecting lens is disposed at such a position as to avoid an increase in the laser light amount per unit area by collection of laser light of 430 nm wavelength or less, concerning both of reflected light from a targeted information recording surface having a thinnest protection substrate and to be used in information recording or reproducing, and reflected light from an information recording surface other than the targeted information recording surface to be used in information recording or reproducing, in recording or reproducing on or from the targeted information recording surface. This enables to use a detecting lens made of a resin, and enables to realize an optical head in a small size and at a low cost by using the detecting lens made of a resin.

Preferably, the optical head may further include a collimator lens for converting the laser light emitted from the light source into substantially parallel light, wherein the objective lens collects laser light emitted from the collimator lens on the information recording medium, and assuming that, among the plural information recording surfaces of the information recording medium, the information recording surface having the thinnest protection substrate is defined as a first information recording surface, and an information recording surface different from the first information recording surface is defined as a second information recording surface, a distance Ld (an air conversion value) between a surface of the detecting lens on the side of the light receiving element, and a light receiving surface of the light receiving element satisfies the following formula (1) or (2).

$$\Delta D > Ld + td/nd \quad (1)$$

$$\Delta D < Ld \quad (2)$$

where $$\Delta D = fcl^2/((n \cdot fol^2/(2 \cdot \Delta t)) + fol + fcl - L):$$

a distance (an air conversion value) between the light collecting position of the laser light reflected on the first information recording surface, and the light collecting position of the laser light reflected on the second information recording surface, Δt: a distance between the first information recording surface and the second information recording surface, n: a refractive index of the protection substrate of the information recording medium, fol: a focal length of the objective lens, fcl: a focal length of the collimator lens, L: a distance (an air conversion value) between a principal plane of the objective lens, and a principal plane of the collimator lens, td: a thickness of the detecting lens, and nd: a refractive index of the detecting lens.

In the above arrangement, the detecting lens can be disposed at such a position as to avoid the light collecting position of the reflected light from the first information recording surface, and the light collecting position of the reflected light from the second information recording surface different from the first information recording surface, in recording or reproducing on or from the first information recording surface having the thinnest protection substrate. This enables to increase the light flux diameter of laser light to be transmitted through the detecting lens, and reduce the laser light amount per unit area, thereby making it possible to form a detecting lens of a resin material having a relatively high UV resistance.

Preferably, the detecting lens may be disposed on the side of the objective lens with respect to the light collecting position of the laser light reflected on the second information recording surface. This is advantageous in increasing the curvature radius of the detecting lens for obtaining a predetermined focal length, thereby making it easy to fabricate the detecting lens.

Preferably, the optical head may further include a light flux dividing element for spatially dividing the laser light reflected on the information recording medium to guide the divided laser light to the light receiving element, wherein the detecting lens is integrally subjected to positional adjustment with the light flux dividing element. This enables to reduce the distance between the detecting lens and the light flux dividing element, and dispose the detecting lens at a position where the light flux diameter of laser light is increased.

Preferably, the detecting lens may be disposed on the side of the light receiving element with respect to the light collecting position of the laser light reflected on the second information recording surface. This enables to reduce the light flux diameter required for the detecting lens, thereby making the detecting lens compact.

Preferably, the detecting lens may be disposed at such a position that a light flux diameter of the laser light reflected on the first information recording surface, and a light flux diameter of the laser light reflected on the second information recording surface are substantially equal to each other. This enables to minimize the laser light amount per unit area, among the combinations of the laser light amount of the reflected light from the first information recording surface per unit area, and the laser light amount of the reflected light from the second information recording surface per unit area. Accordingly, the detecting lens can be used for a long time, while securing a transmittance required for the detecting lens made of a resin material having a relatively high UV resistance.

Preferably, the detecting lens may be integrally subjected to positional adjustment with the light receiving element. This enables to keep the distance between the light receiving element and the detecting lens constant. Accordingly, the detecting lens can be easily subjected to positional adjustment with high precision at e.g. a predetermined position where the light flux diameter of the laser light reflected on the first information recording surface, and the light flux diameter of the laser light reflected on the second information recording surface are substantially equal to each other, without an influence of a positional displacement of a light source or a like element.

Preferably, the optical head may further include a light splitting element for separating an incoming optical path along which the laser light emitted from the light source is guided to the objective lens, and an outgoing optical path along which the laser light reflected on the information recording medium is guided to the light receiving element, wherein the detecting lens is disposed between a light collecting position of the laser light reflected on an information recording surface having a thickest protection substrate among the different information recording surfaces, and the light splitting element.

In the above arrangement, even if there are three or more layers of information recording surfaces, the light collecting positions of reflected light from all the information recording surfaces are located between the detecting lens and the light receiving element. This enables to maximize the light flux diameter of all the reflected light to be transmitted through the detecting lens, and minimize the laser light amount per unit area.

The optical head may further include a light splitting element for separating an incoming optical path along which the laser light emitted from the light source is guided to the objective lens, and an outgoing optical path along which the laser light reflected on the information recording medium is guided to the light receiving element, wherein the detecting lens is disposed between the light receiving element and the light splitting element, and between a light collecting position closest to the light splitting element, among the light collecting positions of the laser light reflected on the different information recording surfaces, and the light splitting element.

In the above arrangement, even if there are three or more layers of information recording surfaces, the light collecting positions of reflected light from all the information recording surfaces are located between the detecting lens and the light receiving element, or at a position upstream of the light splitting element on the outgoing optical path. This enables to increase the light flux diameter of all the reflected light to be transmitted through the detecting lens, and reduce the laser light amount per unit area.

The optical head may further include a light splitting element for separating an incoming optical path along which the laser light emitted from the light source is guided to the objective lens, and an outgoing optical path along which the laser light reflected on the information recording medium is guided to the light receiving element, wherein the detecting lens is disposed between the light receiving element and the light splitting element, and between a first light collecting position closest to the light splitting element, and a second light collecting position on the side of the light receiving element and adjacent to the first light collecting position, among the light collecting positions of the laser light reflected on the different information recording surfaces.

In the above arrangement, even if there is no sufficient space for disposing the detecting lens between the first light collecting position and the light splitting element, the laser light amount per unit area can be reduced, because the light collecting positions of reflected light from all the information recording surfaces are located outside the detecting lens, and the light flux diameter of all the reflected light to be transmitted through the detecting lens is increased.

Preferably, the optical head may further include a light splitting element for separating an incoming optical path along which the laser light emitted from the light source is guided to the objective lens, and an outgoing optical path along which the laser light reflected on the information recording medium is guided to the light receiving element, wherein the optical head satisfies the following formula:

$$d1/2 > d2 + td/2$$

where d1 is a distance between a light receiving surface of the light receiving element, and a light exit surface of the light splitting element, d2 is a distance between the light exit surface of the light splitting element, and the detecting lens, and td is a thickness of the detecting lens.

The above arrangement enables to increase the light flux diameter of all the reflected light to be transmitted through the detecting lens, and reduce the laser light amount per unit area.

Preferably, the detecting lens may be an anamorphic lens for imparting astigmatism to the laser light reflected on the information recording medium. This enables to impart astigmatism to laser light for obtaining a focus error signal to be used by an astigmatism method, with a simplified arrangement.

Preferably, at least one surface of a light incident surface and a light exit surface of the detecting lens may be a toric surface. In this arrangement, since at least one surface of the light incident surface and the light exit surface of the detecting lens is a toric surface, a focal length and a focal line position with respect to each of two axes orthogonal to each other and constituting a front side focal line and a rear side focal line to be used by an astigmatism method can be substantially desirably set.

Preferably, both of the light incident surface and the light exit surface of the detecting lens may be toric surfaces. In this arrangement, since both of the light incident surface and the light exit surface of the detecting lens are toric surfaces, a focal length and a focal line position with respect to each of two axes orthogonal to each other and constituting a front side focal line and a rear side focal line to be used by an astigmatism method can be more easily set.

Preferably, a back focus distance of the detecting lens may be smaller than a back focus distance of a lens having a focal length equal to a focal length of the detecting lens, and having at least one cylindrical surface. In this arrangement, since the distance from the detecting lens to the light receiving element can be reduced, the optical head can be resultantly made compact.

Preferably, a focal length of the detecting lens in a first axis direction orthogonal to an optical axis, and a focal length of the detecting lens in a second axis direction orthogonal to the optical axis and the first axis direction may be substantially equal to each other. In this arrangement, since a focus error signal to be detected by the light receiving element is symmetrically varied with respect to a focus displacement, linearity of the focus error signal near a focal point can be made satisfactory.

The detecting lens may be a relay lens for changing a convergent angle of the laser light reflected on the information recording medium. In this arrangement, by disposing the detecting lens at such a position as to avoid an increase in the laser light amount per unit area by collection of blue-violet laser light, concerning both of reflected light from a targeted information recording surface to be used in information recording or reproducing, and reflected light from an information recording surface other than the targeted information recording surface to be used in information recording or reproducing, a relay lens made of a resin can be used, as the detecting lens. Thus, an optical head can be realized in a small size and at a low cost by using the relay lens made of a resin.

An optical head device according to another aspect of the invention includes: the optical head having the above arrangement; a driver for rotatably driving the information recording medium; and a controller for controlling the optical head and the driver.

A computer according to yet another aspect of the invention includes: the optical disc device having the above arrangement; an input device for allowing a user to input information; a computing device for performing a computation based on information reproduced from the optical disc device and/or the information inputted through the input device; and an output device for outputting the information reproduced from the optical disc device and/or the information inputted through the input device, and/or the computation result by the computing device.

An optical disc player according to yet another aspect of the invention includes: the optical disc device having the above arrangement; and a decoder for converting an information signal to be obtained from the optical disc device into image information.

An optical disc recorder according to still another aspect of the invention includes: the optical disc device having the above arrangement; and an encoder for converting image information into an information signal to be recorded by the optical disc device.

The above arrangements enable to use a detecting lens made of a resin, and realize a compact and inexpensive optical head and optical disc device by using the detecting lens made of a resin. Thereby, a computer, an optical disc player, and an optical disc recorder can be provided in a small size and at a low cost.

INDUSTRIAL APPLICABILITY

The inventive optical head is usable with a detecting lens made of a resin, and a compact and inexpensive optical head and optical disc device can be realized by using a lens made of a resin. Further, a computer, an optical disc player, and an optical disc recorder each having the inventive optical disc device can be realized in a small size and at a low cost, and can be used in a wide range.

The invention claimed is:

1. An optical head comprising:
    a light source for emitting laser light of 430 nm wavelength or less;
    a collimator lens for converting the laser light emitted from the light source into substantially parallel light;
    an objective lens for collecting the laser light emitted from the collimator lens on an information recording medium having plural information recording surfaces;
    a detecting lens for imparting astigmatism to the laser light reflected on the information recording medium and collected by the collimator lens; and
    a light receiving element for receiving the laser light subjected to the astigmatism by the detecting lens,
    wherein the detecting lens is made of a resin material,
    wherein the detecting lens is disposed on a side of the objective lens with respect to a light collecting position, by the collimator lens, of the laser light reflected on a second information recording surface different from a first information recording surface having a thinnest protection substrate, among the plural information recording surfaces of the information recording medium, during recording or reproducing on or from the first information recording surface having the thinnest protection substrate,
    wherein the optical head further comprises a light splitting element for separating (i) an incoming optical path along which the laser light emitted from the light source is guided to the objective lens, and (ii) an outgoing optical path along which the laser light reflected on the information recording medium is guided to the light receiving element,
    wherein the optical head satisfies the following formula:

$$d1/2 > d2 + td/2$$

where d1 is a distance between a light receiving surface of the light receiving element and a light exit surface of the light splitting element, d2 is a distance between the light exit surface of the light splitting element and the detecting lens, and td is a thickness of the detecting lens.

2. The optical head according to claim 1,
    wherein a distance Ld (an air conversion value) between a surface of the detecting lens on a side of the light receiving element and a light receiving surface of the light receiving element satisfies the following formula:

$$\Delta D < Ld$$

where
    $\Delta D = fcl^2/((n \cdot fol^2/(2 \cdot \Delta t)) + fol + fcl - L)$: a distance (an air conversion value) between the light collecting position of laser light reflected on the first information recording surface and the light collecting position of laser light reflected on the second information recording surface,
    $\Delta t$: a distance between the first information recording surface and the second information recording surface,
    n: a refractive index of a protection substrate of the information recording medium,
    fol: a focal length of the objective lens,
    fcl: a focal length of the collimator lens,
    L: a distance (an air conversion value) between a principal plane of the objective lens and a principal plane of the collimator lens.

3. The optical head according to claim 2, further comprising:
    a light flux dividing element for spatially dividing the laser light reflected on the information recording medium to guide the divided laser light to the light receiving element,
    wherein the detecting lens is integrally subjected to positional adjustment with the light flux dividing element.

4. The optical head according to claim 1,
    wherein the detecting lens is disposed between (i) light collecting position of the laser light reflected on an information recording surface having a thickest protection substrate, among the plural information recording surfaces of the information recording medium, and (ii) the light splitting element.

5. The optical head according to claim 1,
    wherein the detecting lens is disposed (i) between the light receiving element and the light splitting element, and (ii) between (a) a light collecting position closest to the light splitting element, among light collecting positions of the laser light reflected on the plural information recording surfaces of the information recording medium, and (b) the light splitting element.

6. The optical head according to claim 1,
    wherein the detecting lens is disposed (i) between the light receiving element and the light splitting element, and (ii) between (a) a first light collecting position closest to the light splitting element and (b) a second light collecting position on the side of the light receiving element and adjacent to the first light collecting position, among light collecting positions of the laser light reflected on the plural information recording surfaces of the information recording medium.

7. The optical head according to claim 1,
    wherein at least one surface out of a light incident surface and a light exit surface of the detecting lens is a toric surface.

8. The optical head according to claim 7,
    wherein a back focus distance of the detecting lens is smaller than a back focus distance of a lens having (i) focal length equal to a focal length of the detecting lens and (ii) at least one cylindrical surface.

9. An optical disc device comprising:
the optical head of claim 1;
a driver for rotatably driving the information recording medium; and
a controller for controlling the optical head and the driver.

10. A computer comprising:
the optical disc device of claim 9;
an input device for allowing a user to input information;
a computing device for performing a computation based on information reproduced from the optical disc device and/or the information inputted through the input device; and
an output device for outputting the information reproduced from the optical disc device and/or the information inputted through the input device, and/or the computation result by the computing device.

11. An optical disc player comprising:
the optical disc device of claim 9; and
a decoder for converting an information signal to be obtained from the optical disc device into image information.

12. An optical disc recorder comprising:
the optical disc device of claim 9; and
an encoder for converting image information into an information signal to be recorded by the optical disc device.

13. An optical head comprising:
a light source for emitting laser light of 430 nm wavelength or less;
a collimator lens for converting the laser light emitted from the light source into substantially parallel light;
an objective lens for collecting the laser light emitted from the collimator lens on an information recording medium having plural information recording surfaces;
a detecting lens for imparting astigmatism to the laser light reflected on the information recording medium and collected by the collimator lens; and
a light receiving element for receiving the laser light subjected to the astigmatism by the detecting lens,
wherein the detecting lens is made of a resin material,
wherein the detecting lens is disposed on a side of the objective lens with respect to a light collecting position, by the collimator lens, of the laser light reflected on a second information recording surface different from a first information recording surface having a thinnest protection substrate, among the plural information recording surfaces of the information recording medium, during recording or reproducing on or from the information recording surface having the thinnest protection substrate, and
wherein both of a light incident surface and a light exit surface of the detecting lens are toric surfaces.

14. The optical head according to claim 13,
wherein (i) focal length of the detecting lens in a first axis direction orthogonal to an optical axis and (ii) a focal length of the detecting lens in a second axis direction orthogonal to the optical axis and the first axis direction are substantially equal to each other.

15. The optical head according to claim 13,
wherein a back focus distance of the detecting lens is smaller than a back focus distance of a lens having (i) a focal length equal to a focal length of the detecting lens and (ii) at least one cylindrical surface.

16. An optical disc device comprising:
the optical head of claim 13;
a driver for rotatably driving the information recording medium; and
a controller for controlling the optical head and the driver.

17. A computer comprising:
the optical disc device of claim 16;
an input device for allowing a user to input information;
a computing device for performing a computation based on information reproduced from the optical disc device and/or the information inputted through the input device; and
an output device for outputting the information reproduced from the optical disc device and/or the information inputted through the input device, and/or the computation result by the computing device.

18. An optical disc player comprising:
the optical disc device of claim 16; and
a decoder for converting an information signal to be obtained from the optical disc device into image information.

19. An optical disc recorder comprising:
the optical disc device of claim 16; and
an encoder for converting image information into an information signal to be recorded by the optical disc device.

* * * * *